United States Patent
Al Sheikh et al.

(10) Patent No.: US 11,074,077 B1
(45) Date of Patent: Jul. 27, 2021

(54) REUSING EXECUTED, FLUSHED INSTRUCTIONS AFTER AN INSTRUCTION PIPELINE FLUSH IN RESPONSE TO A HAZARD IN A PROCESSOR TO REDUCE INSTRUCTION RE-EXECUTION

(71) Applicant: Microsoft Technology Licensing, LLC, Redmond, WA (US)

(72) Inventors: Rami Mohammad Al Sheikh, Morrisville, NC (US); Michael Scott McIlvaine, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/911,901

(22) Filed: Jun. 25, 2020

(51) Int. Cl.
   *G06F 9/30*       (2018.01)
   *G06F 9/38*       (2018.01)

(52) U.S. Cl.
   CPC ........ *G06F 9/3808* (2013.01); *G06F 9/30181* (2013.01); *G06F 9/3867* (2013.01)

(58) Field of Classification Search
   None
   See application file for complete search history.

(56) References Cited

U.S. PATENT DOCUMENTS

| | | | |
|---|---|---|---|
| 7,152,155 B2 | 12/2006 | McIlvaine et al. | |
| 7,165,167 B2 * | 1/2007 | Filippo | G06F 9/3842 712/225 |
| 7,254,700 B2 | 8/2007 | Levitan et al. | |
| 7,664,936 B2 | 2/2010 | Jensen et al. | |
| 8,028,151 B2 | 9/2011 | Abernathy et al. | |
| 8,417,925 B2 | 4/2013 | Nguyen | |
| 9,495,167 B2 * | 11/2016 | Alexander | G06F 9/30043 |
| 10,884,749 B2 * | 1/2021 | Sadasivam | G06F 9/3846 |
| 2006/0282829 A1 * | 12/2006 | McIlvaine | G06F 9/3867 717/131 |

(Continued)

OTHER PUBLICATIONS

Connors et al.; Compiler-Directed Dynamic Computation Reuse: Rationale and Initial Results; IEEE; 1999.*

(Continued)

*Primary Examiner* — Corey S Faherty
(74) *Attorney, Agent, or Firm* — Withrow & Terranova, PLLC

(57) ABSTRACT

Reusing executed, flushed instructions after an instruction pipeline flush in response to a hazard in a processor to reduce instruction re-execution is disclosed. An instruction processing circuit detects fetched performance degrading instructions (PDIs) in an instruction pipeline that may cause a flushing of the instruction pipeline. In response to detecting a PDI, the instruction processing circuit is configured to store the PDI and/or its successor younger instructions in a pipeline execution refill circuit. In response to successful execution of such PDI and/or younger instructions, information about their input value(s) and produced output value(s) when executed are captured in the pipeline execution refill circuit. If a newly fetched instruction and its same input value(s) has been previously captured from the pipeline execution refill circuit, the instruction processing circuit is configured to inject the previously captured produced output value into the instruction pipeline without having to re-execute the newly fetched instruction.

35 Claims, 6 Drawing Sheets

(56) References Cited

U.S. PATENT DOCUMENTS

2016/0239308 A1* 8/2016 Alexander ............ G06F 9/3861

OTHER PUBLICATIONS

Mutlu et al.; On Reusing the Results of Pre-Executed Instructions in a Runahead Execution Processor; IEEE; 2005.*
Monoharan et al.; Dynamic Exploitation of Redundancy in Programs Using Value Prediction and Instruction Reuse; 2003.*
Wolff et al.; Re-examining Instruction Reuse in Pre-execution Approaches ; 2011.*
Gandhi, et al., "Reducing Branch Misprediction Penalty via Selective Branch Recovery", In Proceedings of 10th International Symposium on High Performance Computer Architecture, Feb. 14, 2004, 11 Pages.
Naresh, et al., "SPF:Selective Pipeline Flush", In Proceedings of IEEE 36th International Conference on Computer Design (ICCD), Oct. 7, 2018, pp. 152-155.
Pilla, et al., "A Speculative Trace Reuse Architecture with Reduced Hardware Requirements", In Proceedings of 18th International Symposium on Computer Architecture and High Performance Computing, Oct. 17, 2006, 8 Pages.

* cited by examiner

| PIPELINE EXECUTION REFILL CIRCUIT (344) | | | | | |
|---|---|---|---|---|---|
| | REFILL TAG (350) | SOURCE IDENT. (356) | VALID IND. (368) | USEFUL IND. (370) | INPUT INFO. (358) | OUTPUT INFO. (360) |
| 346(0) | 350(0) | 356(0) | 368(0) | 370(0) | 358(0) | 360(0) |
| | ... | ... | ... | ... | ... | ... |
| 346(R) | 350(R) | 356(R) | 368(R) | 370(R) | 358(R) | 360(R) |

REUSING EXECUTED, FLUSHED INSTRUCTIONS AFTER AN INSTRUCTION PIPELINE FLUSH IN RESPONSE TO A HAZARD IN A PROCESSOR TO REDUCE INSTRUCTION RE-EXECUTION

FIELD OF THE DISCLOSURE

The technology of the disclosure relates to computer processors ("processors"), and more particularly to fetching of computer program instructions to be executed in the processor.

Background

Microprocessors, also known as "processors," perform computational tasks for a wide variety of applications. A conventional microprocessor includes a central processing unit (CPU) that includes one or more processor cores, also known as "CPU cores." The CPU executes computer program instructions ("instructions"), also known as "software instructions," to perform operations based on data and generate a result, which is a produced value. The handling of each instruction in the processor is split into a series of different stages or steps known as instruction pipelining. This allows multiple instructions to be processed at the same time in different stages to increase instruction processing throughput, as opposed to each instruction being processed sequentially and fully executed before processing a next instruction. Instruction pipelining steps are executed in one or more instruction pipelines in the processor each composed of multiple processes stages.

Optimal processor performance can be achieved if all pipeline stages in an instruction pipeline are able to process instructions concurrently in the instruction pipeline. However, hazards can occur in an instruction pipeline where an instruction cannot be executed without leading to incorrect computation results. One example of a hazard that can cause an instruction pipeline to be flushed is a structural hazard. An example of a structural hazard is a load instruction that fails to load an entry into a load queue that may be full. If the load instruction cannot execute, a deadlock could occur in the instruction pipeline. Another example of a hazard that can cause a pipeline to be flushed is a control hazard resulting from execution of a control flow instruction that causes a precise interrupt in the processor. One example of a control flow instruction that can cause a control hazard is a conditional branch instruction. A conditional branch instruction includes a predicate condition that is not fully evaluated in a later execution stage in an instruction pipeline to determine if the instruction flow will branch or not branch. So as to not have to stall the fetching of successor, younger instructions behind the conditional branch instruction into an instruction pipeline before the conditional branch instruction is executed, a control flow prediction circuit can be provided in the processor to speculatively predict the branch target address of the conditional branch instruction. The processor can then speculatively fetch successor instructions in the fetch stages of an instruction pipeline following the fetch of a conditional branch instruction based on the prediction of a branch target address.

If the actual resolved branch target address is determined in execution to match the predicted branch address, a stall is not incurred in instruction pipeline. This is because the successor instructions started at the predicted branch target address will have been correctly fetched and already be present in the instruction pipeline when the conditional branch instruction reaches the execution stage of an instruction pipeline. However, if the predicted and resolved branch target addresses do not match, a mispredicted branch hazard occurs in the instruction pipeline that causes a precise interrupt. As a result, the instruction pipeline is flushed of existing, previously fetched instructions in the various stages of the instruction pipeline. The fetch stage of the instruction pipeline is instructed to fetch new instructions starting from the correct, resolved branch target. Thus, stages in the instruction pipeline will remain dormant until the newly fetched instructions make their way through the instruction pipeline to be processed and executed, thereby reducing instruction throughput performance.

There are also other situations encountered when processing instructions beyond branch that can cause structural hazards and thus cause a flush of an instruction pipeline. Examples include deadlocks and instructions that cannot be executed due to lack of resources, such as available space in a queue.

SUMMARY

Exemplary aspects disclosed herein include reusing executed, flushed instructions after an instruction pipeline flush in response to a hazard in a processor to reduce instruction re-execution. The processor includes an instruction processing circuit that is configured to fetch instructions into an instruction pipeline to be processed and executed in an execution stage as part of instruction pipelining. The execution circuit in the instruction processing circuit is configured to generate a precise interrupt in response to encountering a hazard (e.g., a structural or control flow hazard) when executing an instruction. For example, the precise interrupt may have been generated as a result of a mispredicted conditional branch instruction wherein younger, control dependent instructions on the conditional branch instruction from an incorrect instruction flow path are already fetched into the instruction pipeline. In response the precise interrupt, the instruction processing circuit is configured to flush the instruction that caused the precise interrupt and its younger instructions in the instruction pipeline to overcome the hazard. This results in a reduced instruction throughput in the instruction pipeline by having to re-execute these flushed instructions. However, if these flushed instructions had been previously successfully executed in the instruction pipeline and execution information about their execution was captured when previously executed, this execution information could be reused and injected into in the instruction pipeline after the flush, without the need to re-execute these instructions.

In this regard, in exemplary aspects disclosed herein, the instruction processing circuit in the processor is configured to detect fetched instructions in a pre-execution stage in an instruction pipeline that may cause a precise interrupt that would cause flushing of an instruction pipeline. These instructions can be referred to as performance degrading instructions (PDIs). For example, the instruction processing circuit is configured to detect a PDI to be executed in an execution stage of the instruction pipeline. In response to detecting the PDI in the instruction pipeline, the instruction processing circuit is configured to capture execution information for the detected PDI and/or its successor, younger instructions processed in the instruction pipeline behind the PDI as detected instructions in a pipeline execution refill circuit. The instruction processing circuit information is also configured to capture input information as execution information used to execute the captured detected instructions and the output information (e.g., output value) generated when the detected instructions are executed, in the pipeline execution refill circuit. The input information of the executed instructions can be the actual resolved input values or information about the input operand(s) of the instructions, as examples. The instruction processing circuit is configured to determine if an instance of newly fetched instructions in a pre-execution stage of the instruction pipeline have already been captured in the pipeline execution refill circuit, and if so, if the information about input information captured for such fetched instruction in the pipeline execution refill circuit matches the input information for the newly fetched instruction. If the input information matches, this means that the previously captured, produced output information (e.g., output value) as part of the execution information for the instruction in the instruction execution refill circuit when previously executed can be reused in the current execution of the newly fetched instruction in the instruction pipeline. This is because for a given instruction, the produced output information generated by its execution will be the same if its input information is the same. The instruction processing circuit can inject the previously captured output information in the pipeline execution refill circuit determined to be applicable to the instance of the newly fetched instruction to a commit or write-back stage for the newly fetched instruction without having to re-execute the newly fetched instruction in the instruction pipeline to generate its output value.

The instruction processing circuit is configured to capture execution information for detected instructions (i.e., the detected PDI and/or its successor, younger instructions) in the pipeline execution refill circuit based on detecting a PDI, because PDIs are most likely to encounter a hazard that causes a flush of the instruction pipeline. Younger instructions that follow an instruction that does not encounter a hazard and cause a flush of the instruction pipeline will be successfully executed from their initial fetch and thus are not re-executed. However, younger instructions processed behind a PDI that were flushed as a result of a hazard generated by execution of a PDI will need to be re-executed. Thus, if the previous output information generated by execution of such successor, younger instructions was captured when the younger instructions were not flushed, this output information can be reused when re-processing the younger instructions as a result of flushing without having to re-execute such instructions. As a result and as an example, instructions that are dependent on the younger instruction that does not have to be re-executed, may be able to be issued for execution sooner.

As an example, execution information for PDIs, such as memory load operations, that are conventionally flushed and then re-fetched for re-execution if their execution causes a flush event, is captured in response to detecting the PDI. This is so that this captured output information can be later injected in the instruction pipeline when such PDI is re-fetched for re-execution to avoid the need for re-execution. As another example, execution information for PDIs, such as conditional branch instructions, that are conventionally not flushed and thus not re-fetched for re-execution if their execution causes a flush event, need not be captured in response to detecting the PDI.

In this regard, in one exemplary aspect, a processor is disclosed, comprising an instruction processing circuit. The instruction processing circuit comprises an instruction fetch circuit configured to fetch a plurality of instructions as a plurality of fetched instructions from a program code into an instruction pipeline to be executed, and an execution circuit coupled to the instruction fetch circuit. The execution circuit is configured to execute a fetched instruction among the plurality of fetched instructions in the instruction pipeline, and generate a pipeline flush event to flush the instruction pipeline in response to the execution of a fetched instruction among the plurality of fetched instructions comprising a PDI generating a hazard. The processor also comprises an instruction reuse circuit coupled to the instruction pipeline between the instruction fetch circuit and the execution circuit. The instruction reuse circuit is configured to determine if a source identification of the fetched instruction matches a source identification in a refill tag in an execution refill entry as a matching execution refill entry among a plurality of execution refill entries of a pipeline execution refill circuit. In response to the source identification of the fetched instruction matching the source identification in the refill tag in the matching execution refill entry, the instruction reuse circuit is configured to determine if input information of the fetched instruction matches input information in the matching execution refill entry. In response to the input information of the fetched instruction matching the input information in the matching execution refill entry, the instruction reuse circuit is configured to cause output information for the fetched instruction in the matching execution refill entry for the fetched instruction to be committed.

In another exemplary aspect, a method of reusing executed, flushed instructions in an instruction pipeline in a processor is disclosed. The method comprises fetching a plurality of instructions as a plurality of fetched instructions from a program code into an instruction pipeline to be executed and executing a fetched instruction among the plurality of fetched instructions in the instruction pipeline. The method also comprises generating a pipeline flush event to flush the instruction pipeline in response to the execution of a fetched instruction among the plurality of fetched instructions comprising a PDI generating a hazard, and determining if a source identification of the fetched instruction before being executed matches a source identification in a refill tag in an execution refill entry as a matching execution refill entry among a plurality of execution refill entries of a pipeline execution refill circuit. In response to the source identification of the fetched instruction matching the source identification in the refill tag as a matching execution refill entry, the method also comprises determining if input information of the fetched instruction matches input information in the matching execution refill entry. In response to the input information of the fetched instruction matching the input information in the matching execution refill entry, the method also comprises causing output information for the fetched instruction in the matching execution refill entry for the fetched instruction to be committed.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a diagram of an exemplary processor-based system that includes a processor with an instruction processing circuit that includes one or more instruction pipelines for processing computer instructions, wherein the instruction processing circuit is configured to reuse output information for a newly fetched instruction (i.e., a fetched PDI and/or its fetched, successor, younger instructions) previously captured from a previous successful execution of the newly fetched instruction following a preceding, detected PDI in the instruction pipeline, to avoid the need to re-execute the newly fetched instruction;

Figure 1:
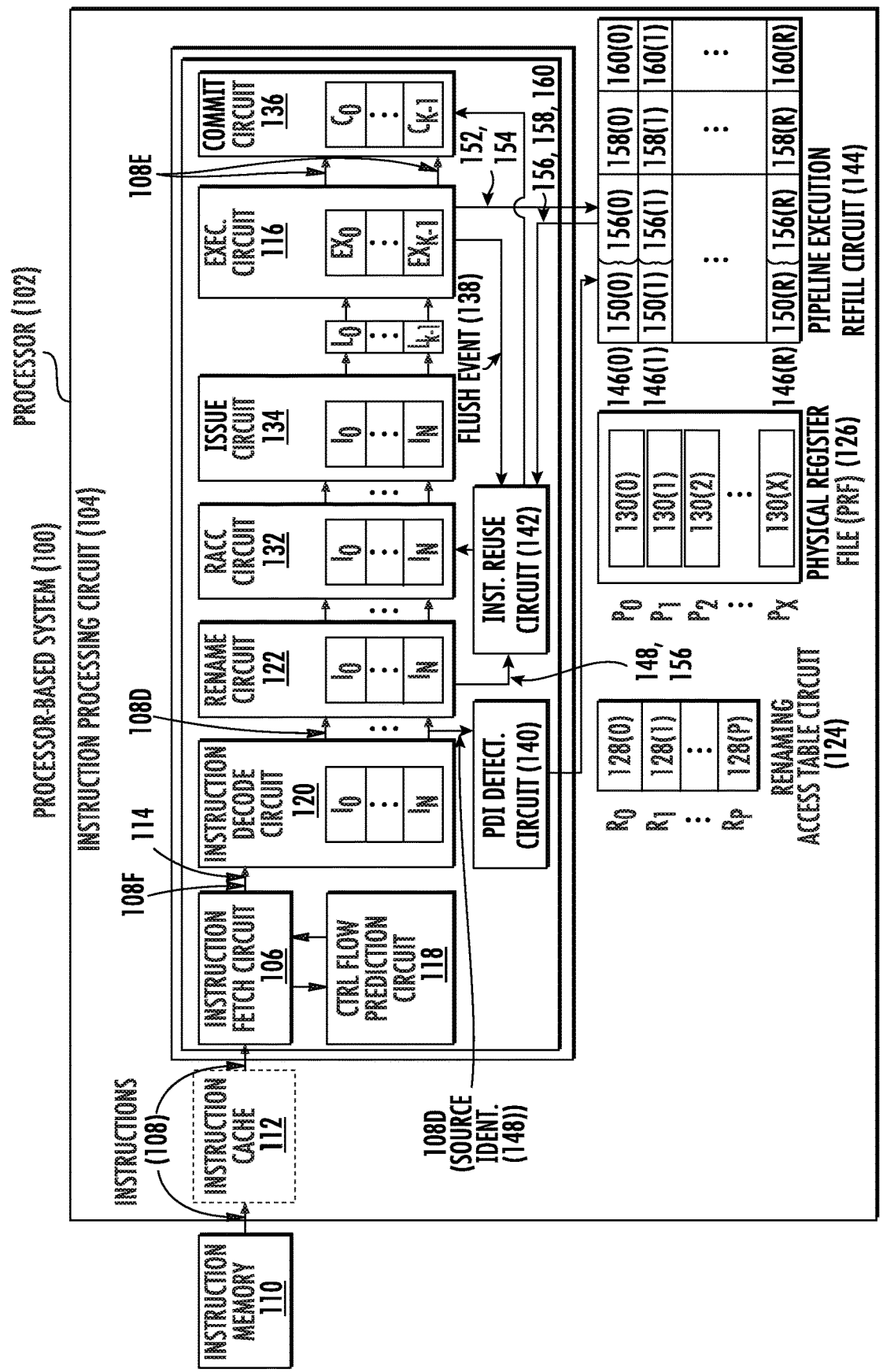
Figure 2A:
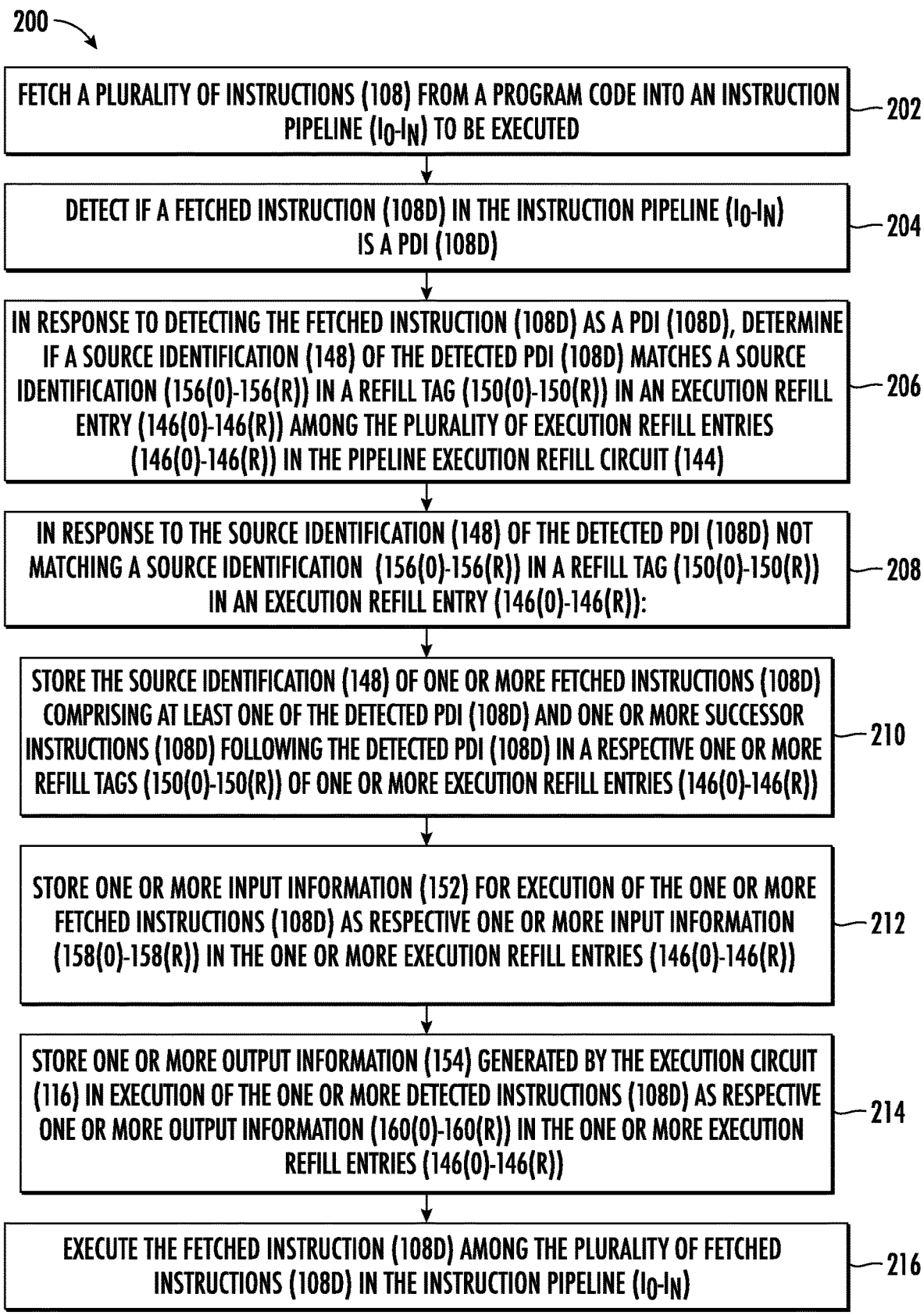
FIG. 2A is a flowchart illustrating an exemplary process of the instruction processing circuit in FIG. 1 detecting and capturing execution information for fetched instructions in the instruction pipeline into the pipeline fetch refill circuit.
Figure 2B:
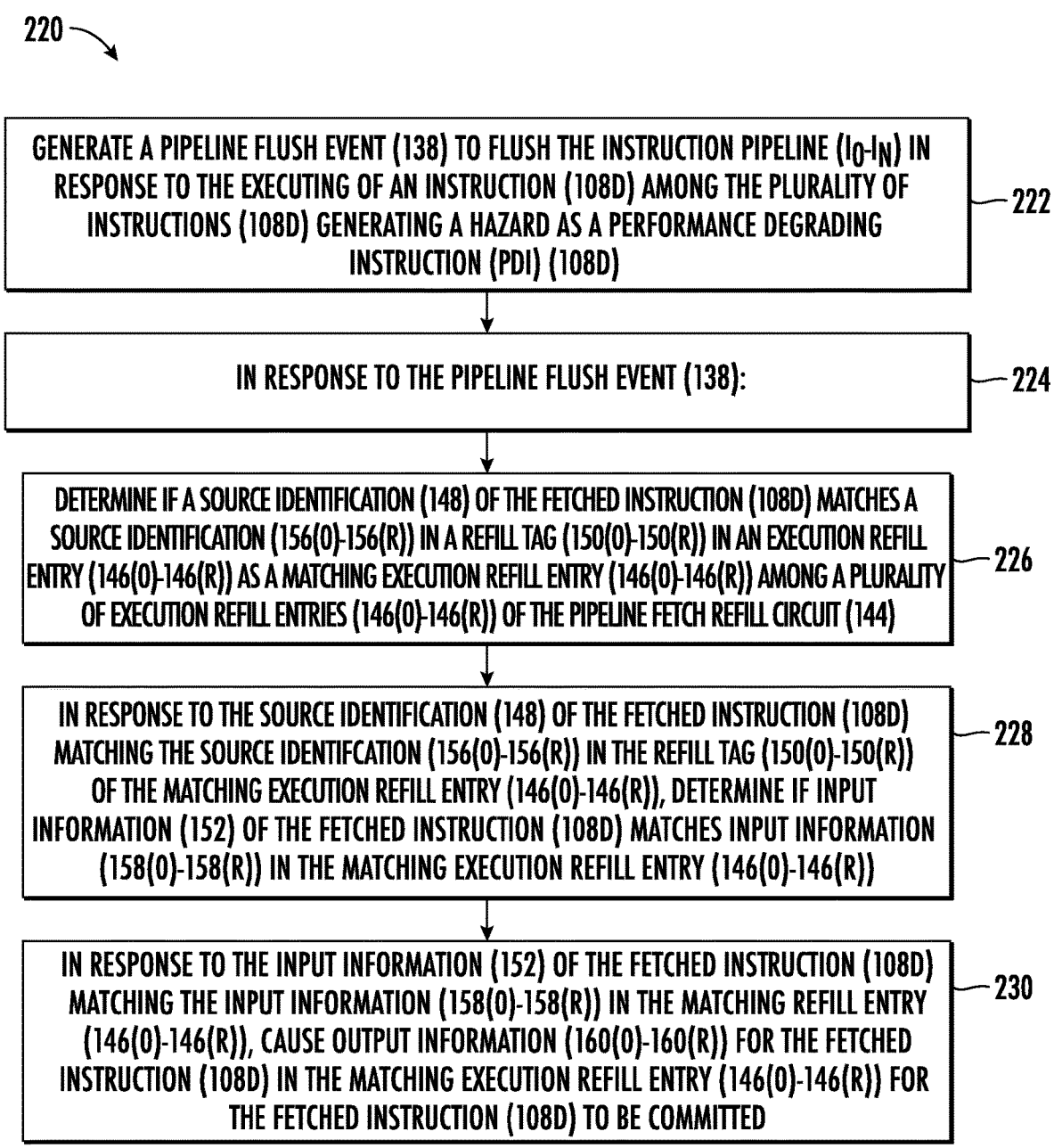
FIG. 2B is a flowchart illustrating an exemplary process of the instruction processing circuit in FIG. 1 reusing output information in captured execution information for a previously fetched and executed instruction from a pipeline execution refill circuit in an instruction pipeline in response to a flush event caused by execution of the PDI.
Figure 3:
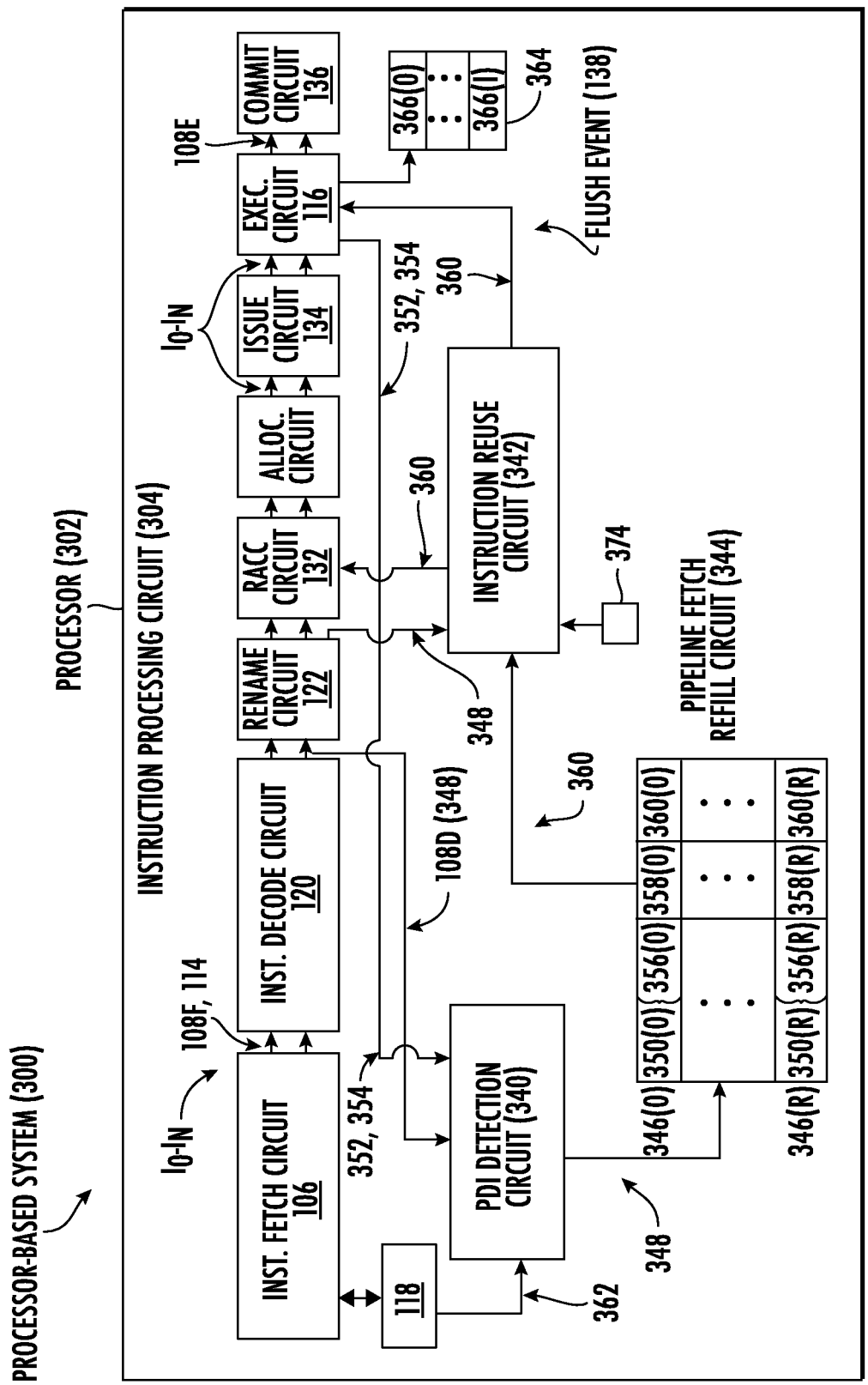
Figure 5:
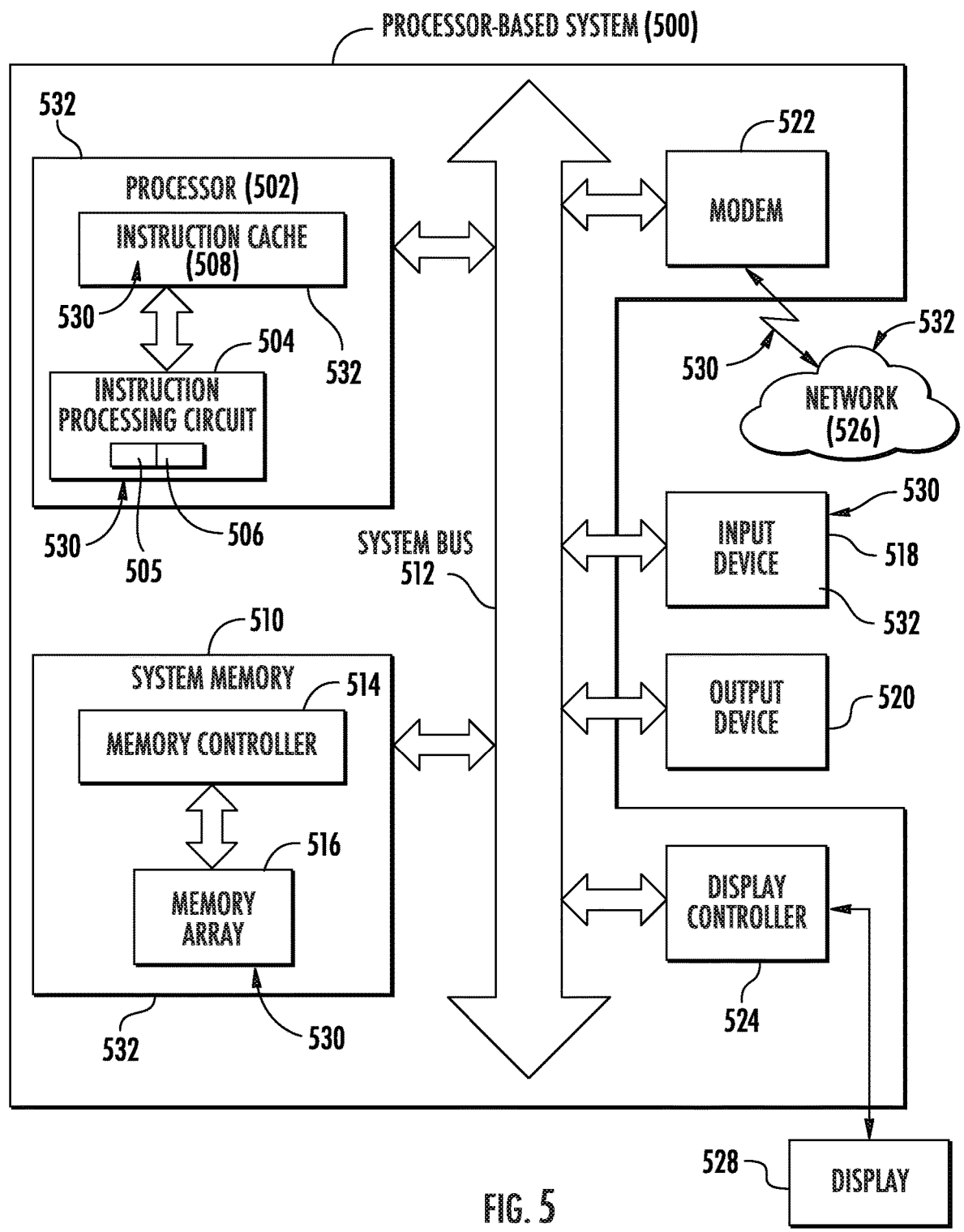

FIG. 3 is a diagram of another exemplary processor-based system that includes a processor with an instruction processing circuit that includes one or more instruction pipelines for processing computer instructions, wherein the instruction processing circuit is configured to reuse output information of previously captured execution information for a newly fetched instruction previously captured from a previous successful execution of the newly fetched instruction to avoid the need to re-execute the newly fetched instruction;

FIG. 4 is a diagram of an exemplary pipeline execution fill circuit in FIG. 3 configured to store captured input information and output information as execution information of previously executed instructions for reuse if such instructions are again fetched for execution; and FIG. 5 is a block diagram of an exemplary processor-based system that includes a processor with an instruction processing circuit configured to reuse output information in previously captured execution information for a newly fetched instruction previously captured from a previous successful execution of the newly fetched instruction in the instruction pipeline, to avoid the need to re-execute the newly fetched instruction, including but not limited to the exemplary instruction processing circuits in FIGS. 1 and 3 and according to, but not limited to, the exemplary processes in FIGS. 2A and 2B.

DETAILED DESCRIPTION

Exemplary aspects disclosed herein include reusing executed, flushed instructions after an instruction pipeline flush in response to a hazard in a processor to reduce instruction re-execution. The processor includes an instruction processing circuit that is configured to fetch instructions into an instruction pipeline to be processed and executed in an execution stage as part of instruction pipelining. The execution circuit in the instruction processing circuit is configured to generate a precise interrupt in response to encountering a hazard (e.g., a structural or control flow hazard) when executing an instruction. For example, the precise interrupt may have been generated as a result of a mispredicted conditional branch instruction wherein younger, control dependent instructions on the conditional branch instruction from an incorrect instruction flow path are already fetched into the instruction pipeline. In response the precise interrupt, the instruction processing circuit is configured to flush the instruction that caused the precise interrupt and its younger instructions in the instruction pipeline to overcome the hazard. This results in a reduced instruction throughput in the instruction pipeline by having to re-execute these flushed instructions. However, if these flushed instructions had been previously successfully executed in the instruction pipeline and execution information about their execution was captured when previously executed, this execution information could be reused and injected into in the instruction pipeline after the flush, without the need to re-execute these instructions.

In this regard, in exemplary aspects disclosed herein, the instruction processing circuit in the processor is configured to detect fetched instructions in a pre-execution stage in an instruction pipeline that may cause a precise interrupt that would cause flushing of an instruction pipeline. These instructions can be referred to as performance degrading instructions (PDIs). For example, the instruction processing circuit is configured to detect a PDI to be executed in an execution stage of the instruction pipeline. In response to detecting the PDI in the instruction pipeline, the instruction processing circuit is configured to capture execution information for the detected PDI and/or its successor, younger instructions processed in the instruction pipeline behind the PDI as detected instructions in a pipeline execution refill circuit. The instruction processing circuit information is also configured to capture input information as execution information used to execute the captured detected instructions and the output information (e.g., output value) generated when the detected instructions are executed, in the pipeline execution refill circuit. The input information of the executed instructions can be the actual resolved input values or information about the input operand(s) of the instructions, as examples. The instruction processing circuit is configured to determine if an instance of newly fetched instructions in a pre-execution stage of the instruction pipeline have already been captured in the pipeline execution refill circuit, and if so, if the information about input information captured for such fetched instruction in the pipeline execution refill circuit matches the input information for the newly fetched instruction. If the input information matches, this means that the previously captured, produced output information (e.g., output value) as part of the execution information for the instruction in the instruction execution refill circuit when previously executed can be reused in the current execution of the newly fetched instruction in the instruction pipeline. This is because for a given instruction, the produced output information generated by its execution will be the same if its input information is the same. The instruction processing circuit can inject the previously captured output information in the pipeline execution refill circuit determined to be applicable to the instance of the newly fetched instruction to a commit or write-back stage for the newly fetched instruction without having to re-execute the newly fetched instruction in the instruction pipeline to generate its output value.

The instruction processing circuit is configured to capture execution information for detected instructions (i.e., the detected PDI and/or its successor, younger instructions) in the pipeline execution refill circuit based on detecting a PDI, because PDIs are most likely to encounter a hazard that causes a flush of the instruction pipeline. Younger instructions that follow an instruction that does not encounter a hazard and cause a flush of the instruction pipeline will be successfully executed from their initial fetch and thus are not re-executed. However, younger instructions processed behind a PDI that were flushed as a result of a hazard generated by execution of a PDI will need to be re-executed. Thus, if the previous output information generated by execution of such successor, younger instructions was captured when the younger instructions were not flushed, this output information can be reused when re-processing the younger instructions as a result of flushing without having to re-execute such instructions. As a result and as an example, instructions that are dependent on the younger instruction that does not have to be re-executed, may be able to be issued for execution sooner.

As an example, execution information for PDIs, such as memory load operations, that are conventionally flushed and then re-fetched for re-execution if their execution causes a flush event, is captured in response to detecting the PDI. This is so that this captured output information can be later injected in the instruction pipeline when such PDI is re-fetched for re-execution to avoid the need for re-execution. As another example, execution information for PDIs, such as conditional branch instructions, that are conventionally not flushed and thus not re-fetched for re-execution if their execution causes a flush event, need not be captured in response to detecting the PDI.

In this regard, FIG. 1 is a schematic diagram of an exemplary processor-based system 100 that includes a processor 102. As will be discussed in more detail below, the processor 102 is configured to reuse executed instructions to process a newly fetched instruction in an instruction pipeline to avoid the need to re-execute the newly fetched instruction. The output information used to process the newly fetched instruction was previously captured from a previous execution of the fetched instruction following a preceding, detected PDI in the instruction pipeline. The newly fetched instruction may have been re-fetched for execution as a result of being previously flushed from the instruction pipeline in response to a hazard encountered when execution a predecessor instruction. Before discussing the reuse of executed instructions in response to another instance of the executed instruction being newly fetched for re-execution, other components of the processor 102 are first discussed below.

With reference to FIG. 1, the processor 102 includes an instruction processing circuit 104 that includes one or more instruction pipelines $I_0$-$I_N$ for processing computer instructions for execution. The processor 102 is an out-of-order processor (OoP) shown in FIG. 1, but could also be an in-order processor. The instruction processing circuit 104 includes an instruction fetch circuit 106 that is configured to fetch instructions 108 from an instruction memory 110. The instruction memory 110 may be provided in or as part of a system memory in the processor-based system 100 as an example. An instruction cache 112 may also be provided in the processor 102 to cache the instructions 108 fetched from the instruction memory 110 to reduce timing delay in the instruction fetch circuit 106. The instruction fetch circuit 106 in this example is configured to provide the instructions 108 as fetched instructions 108F into the one or more instruction pipelines $I_0$-$I_N$ as an instruction stream 114 in the instruction processing circuit 104 to be pre-processed, before the fetched instructions 108F reach an execution circuit 116 to be executed. The instruction pipelines $I_0$-$I_N$ are provided across different processing circuits or stages of the instruction processing circuit 104 to pre-process and process the fetched instructions 108F in a series of steps that can be performed concurrently to increase throughput prior to execution of the fetched instructions 108F by the execution circuit 116.

A control flow prediction circuit 118 (e.g., a control flow prediction circuit) is also provided in the instruction processing circuit 104 in the processor 102 in FIG. 1 to speculate or predict the outcome of a predicate of a fetched conditional control instruction 108F, such as a conditional branch instruction, that affects the instruction control flow path of the instruction stream 114 processed in the instruction pipelines $I_0$-$I_N$. The prediction of the control flow prediction circuit 118 can be used by the instruction fetch circuit 106 to determine the next fetched instructions 108F to fetch based on the predicted branch target address. The instruction processing circuit 104 also includes an instruction decode circuit 120 configured to decode the fetched instructions 108F fetched by the instruction fetch circuit 106 into decoded instructions 108D to determine the instruction type and actions required. The instruction type and action required encoded in the decoded instruction 108D may also be used to determine in which instruction pipeline $I_0$-$I_N$ the decoded instructions 108D should be placed.

In this example, the decoded instructions 108D are placed in one or more of the instruction pipelines $I_0$-$I_N$ and are next provided to a rename circuit 122 in the instruction processing circuit 104. The rename circuit 122 is configured to determine if any register names in the decoded instructions 108D need to be renamed to break any register dependencies that would prevent parallel or out-of-order processing. The rename circuit 122 is configured to call upon a renaming access table circuit 124 to rename a logical source register operand and/or write a destination register operand of a decoded instruction 108D to available physical registers $P_0$, $P_1$, ..., $P_X$ in a physical register file (PRF) 126. The renaming access table circuit 124 contains a plurality of register mapping entries 128(0)-128(P) each mapped to (i.e., associated with) a respective logical register $R_0$-$R_P$. The register mapping entries 128(0)-128(P) are each configured to store respective mapping information for corresponding to the logical registers $R_0$-$R_P$ pointing to a physical register $P_0$-$P_X$ in the PRF 126. Each physical register $P_0$-$P_X$ is configured to store a data entry 130(0)-130(X) for the source and/or destination register operand of a decoded instruction 108D.

The instruction processing circuit 104 in the processor 102 in FIG. 1 also includes a register access circuit 132 located in the instruction pipelines $I_0$-$I_N$ prior to an issue circuit 134. The register access circuit 132 is configured to access a physical register $P_0$-$P_X$ in the PRF 126 based on a register mapping entry 128(0)-128(P) mapped to a logical register $R_0$-$R_P$ in the renaming access table circuit 124 to use as an input value for a named source register operand of a decoded instruction 108D to be executed in the execution circuit 116. The issue circuit 134 is configured to store decoded instructions 108D in reservation entries in the instruction pipeline O-IN until all their respective source register operands are available for consumption in execution. The issue circuit 134 issues decoded instructions 108D ready to be executed to the execution circuit 116. A commit circuit 136 is also provided in the instruction processing circuit 104 to commit or write-back produced values generated by execution of decoded instructions 108D to memory, such as the PRF 126, cache memory, or system memory.

The execution circuit 116 in the instruction processing circuit 104 in the processor 102 in FIG. 1 is configured to generate a precise interrupt in response to encountering a hazard (e.g., a structural or control flow hazard) when executing an instruction 108D. Instructions 108D that when executed cause or are determined to likely cause a hazard in the processor 102 are referred to herein as "performance degrading instructions (PDIs)." By the time the execution circuit 116 encounters the hazard from executing a PDI 108D, successor, younger instructions 108D have already been fetched into an instruction pipeline $I_0$-$I_N$ and potentially decoded to be processed. In response the precise interrupt, the instruction processing circuit 104 is configured to generate a flush event 138 to cause the instruction 108D that caused the precise interrupt as well as its successor, younger instructions 108D already fetched in the instruction pipelines $I_0$-$I_N$ to be flushed and re-executed overcome the hazard. Re-fetching of the PDI 108D and its younger, successor instructions 108D reduces throughput in the instruction processing circuit 104 in an undesired manner.

To avoid the need to re-execute flushed instructions 108D that were flushed by the instruction processing circuit 104 in response to a flush event 138, the instruction processing circuit 104 in the example in FIG. 1 includes a PDI detection circuit 140 and an instruction reuse circuit 142. The PDI detection circuit 140 and instruction reuse circuit 142 can be included as part of the instruction processing circuit 104 or outside of the instruction processing circuit 104. The PDI detection circuit 140 and instruction reuse circuit 142 are both coupled to the instruction pipelines $I_0$-$I_N$. As will be discussed in more detail below, the PDI detection circuit 140 is configured to detect PDIs 108 among the fetched instructions 108F that have been fetched into an instruction pipeline $I_0$-$I_N$ of the instruction processing circuit 104 to be processed and executed. For example, the PDI detection circuit 140 may be configured detect PDIs 108D after being decoded by the instruction decode circuit 120. In response to the PDI detection circuit 140 detecting a PDI 108 in an instruction pipeline $I_0$-$I_N$, which in this example is a decoded PDI 108D, the instruction processing circuit 104 is configured to capture execution information for previously executed instructions, which may include the detected PDI 108D and/or successor, younger fetched instructions 108D, processed in the instruction pipeline $I_0$-$I_N$ following (i.e., behind) the PDI 108D. This is so that this execution information can be later reused by the instruction reuse circuit 142 to process such instructions 108 previously executed and in which their execution information was captured, that are re-fetched, as in response to a flush event 138, without the need for re-execution. This is so that this captured execution information for such instructions 108 can also be later reused by the instruction reuse circuit 142 to process the instructions 108, such as in response to a flush event 138, without the need for re-execution.

A PDI 108D that is flushed may or may not be re-fetched for re-execution depending on its type of PDI. A PDI 108D that is re-fetched for re-execution in response to a flush event 138 is a memory load instruction that encountered a deadlock. For such a PDI 108D, the instruction processing circuit 104 is configured to capture the execution information for such PDI 108D, so that this captured output information can be later injected in the instruction pipeline $I_0$-$I_N$ when and if the PDI 108 is re-fetched to avoid the need for its re-execution. An example of a PDI 108D that need not be re-fetched and re-executed when flushed in response to a flush event 138 is a conditional branch instruction. For such a PDI 108D, the instruction processing circuit 104 does not need to capture execution information for such PDI 108D to avoid the need for its re-execution, because this type of PDI 108D is not re-fetched for re-execution. As discussed in more detail below, captured execution information for fetched instructions 108F is stored in a pipeline execution refill circuit 144. The pipeline execution refill circuit 144 can be a table circuit for example that includes a plurality of execution refill entries 146(0)-146(R) configured to store execution information about the detected PDI 108D and/or successor, younger fetched instructions 108D as detected instructions 108D.

In one example, the PDI detection circuit 140 is configured to use a source identification 148 (e.g., source address, program counter (PC)) of the detected PDI 108D and/or its successor, younger fetched instructions 108D in the instruction pipeline $I_0$-$I_N$ to register the detected PDI 108D and/or its successor, younger fetched instructions 108D in the pipeline execution refill circuit 144. This allows the PDI 108D and/or its successor, younger fetched instructions 108D to be later identified by their source identification 148 by the instruction reuse circuit 142, to reuse their previous execution information, such as after their re-fetching in response to the flush event 138, to avoid the need for their re-execution. The PDI detection circuit 140 is configured to store a source identification 148 for a PDI 108D and/or its successor, younger fetched instructions 108D in a refill tag 150(0)-150(R) in a respective allocated execution refill entry 146(0)-146(R) in the pipeline execution refill circuit 144 based on the source identification 148 of the detected PDI 108D and/or its successor, younger fetched instructions 108D. This registers execution information for detected PDI 108D and/or its successor, younger fetched instructions 108D in the pipeline execution refill circuit 144, in response to the PDI detection circuit 140 detecting a PDI 108D in the instruction pipeline $I_0$-$I_N$. This allows the pipeline execution refill circuit 144 to consult the instruction reuse circuit 142 if and when the detected PDI 108D and/or its successor, younger fetched instructions 108D are re-fetched, to then be able to later re-use the captured execution information about their previous execution for re-use without their need to be re-executed.

However, to reuse captured execution information about PDIs 108D and/or its successor, younger fetched instructions 108D when subsequently re-fetched, this execution information needs to be captured for the instructions 108D in their allocated execution refill entry 146(0)-146(R) in the pipeline execution refill circuit 144 when previously executed. In this regard, output information 154 (e.g., output operand value) generated by execution of the detected PDI 108D and/or its successor, younger fetched instructions 108D in the execution circuit 116 is captured and stored as output information 160(0)-160(R) in a corresponding execution refill entry 146(0)-146(R) in the pipeline execution refill circuit 144. This allows such output information 160(0)-160(R) to be able to be later reused when such PDI 108D and/or its successor, younger fetched instructions 108D are re-fetched and detected by the instruction reuse circuit 142 to avoid the need to re-execute the PDI 108D and/or its successor, younger fetched instructions 108D in a subsequent fetching. If a subsequently fetched PDI 108D and/or its successor, younger fetched instructions 108D is determined to be contained in the pipeline execution refill circuit 144, the previously stored output information 160(0)-160(R) (i.e., the actual output value) generated by execution of the detected PDI 108D and/or its successor, younger fetched instructions 108D can be used again to avoid the need to re-execute the PDI 108D and/or its successor, younger fetched instructions 108D. For example, the output information 160(0)-160(R) captured in the pipeline execution refill circuit 144 for a re-fetched PDI 108D and/or its successor, younger fetched instructions 108D can be provided to the commit circuit 136 to be committed without being re-executed in the execution circuit 116. The output information 160(0)-160(R) captured in the pipeline execution refill circuit 144 for a re-fetched PDI 108D and/or its successor, younger fetched instructions 108D can also be written back to a physical register $P_0$-$P_X$ that is mapped to an output register operand of the detected PDI 108D and/or its successor, younger fetched instructions 108D. The output information 160(0)-160(R) captured in the pipeline execution refill circuit 144 for a re-fetched PDI 108D and/or its successor, younger fetched instructions 108D can also be written back to a physical register $P_0$-$P_X$ that is mapped to an output register operand of the PDI 108D and/or its successor, younger fetched instructions 108D. However, the previous output information 154 generated by execution of the detected PDI 108D and/or its successor, younger fetched instructions 108D is only known to be applicable for use in a re-fetched PDI 108D and/or its successor instructions 108D if the input values consumed by the re-fetched PDI 108D and/or its successor instructions 108D are the same as were consumed when the detected PDI 108D and/or its successor instructions 108D were previously executed as previously captured in the pipeline execution refill circuit 144.

In this regard, with reference to FIG. 1, when the detected PDI 108D and its successor, younger fetched instructions 108F are processed and executed in the instruction pipeline $I_0$-$I_N$, the instruction processing circuit 104 is also configured to capture input information 152 about the detected PDI 108D and/or its successor, younger fetched instructions 108F. The input information 152 can be input operand values that were consumed in the execution of the PDI 108D and/or its successor, younger fetched instructions 108F in their execution. The input information 152 could also be the logical register numbers of input registers named in the PDI 108D and successor, younger fetched instructions 108F as input operands for registers containing input data to be consumed in the execution of the PDI 108D and successor, younger fetched instructions 108F. The input information 152 is recorded in the pipeline execution refill circuit 144 associated with PDI 108D and/or its successor, younger fetched instructions 108D in the pipeline execution refill circuit 144 in response to the PDI 108D detection by the PDI detection circuit 140. Also, the instruction processing circuit 104 is configured to capture output information 154 generated by execution of the detected PDI 108D and/or the successor, younger fetched instructions 108F in the execution circuit 116 as output information 160(0)-160(R) in a corresponding execution refill entry 146(0)-146(R) in pipeline execution refill circuit 144 allocated for its respective PDI 108D and the successor, younger fetched instruction 108D. The output information 154 can be the actual output operand value produced by the execution circuit 116 in execution of the re-fetched PDI 108D and/or the successor, younger fetched instructions 108F.

Then, as new, next instructions 108D are fetched and processed by the instruction processing circuit 104 in the instruction pipeline $I_0$-$I_N$, the instruction reuse circuit 142 can monitor such next instructions 108D in the instruction pipeline $I_0$-$I_N$. For example, the instruction reuse circuit 142 can be configured to monitor such new instructions 108D in response to a flush event 138, because it is known that a flush event 138 will cause successor, younger fetched instructions 108D to be re-fetched that followed the PDI 108D whose execution caused the flush event 138. The instruction reuse circuit 142 can use the source identification 148 of the next instructions 108D being processed in the instruction pipeline $I_0$-$I_N$ to consult the pipeline execution refill circuit 144. The instruction reuse circuit 142 is configured to receive the source identification 148 of the next instructions 108D from the instruction pipeline $I_0$-$I_N$. The instruction reuse circuit 142 determines based on the source identification 148 of the new instruction 108D if execution information about such next instructions 108D was previously captured in one or more execution refill entries 146(0)-146(R) in the pipeline execution refill circuit 144. The instruction reuse circuit 142 is configured to compare the source identification 148 of the next instruction 108D to a source identification 156(0)-156(R) in a corresponding refill tag 150(0)-150(R) in a corresponding execution refill entry 146(0)-146(R) in the pipeline execution refill circuit 144.

In this example, if the instruction reuse circuit 142 determines that the source identification 148 of the next instructions 108D matches the source identification 156(0)-156(R) in a refill tag 150(0)-150(R) in an execution refill entry 146(0)-146(R), the instruction reuse circuit 142 is also configured to compare the input information 152 of the next instruction 108D (e.g., its input register operand or input operand value) to input information 158(0)-158(R) contained in the matching execution refill entry 146(0)-146(R) in the pipeline execution refill circuit 144 that was used to previously execute the next instructions 108D. If the input information 152 of the next instruction 108D matches the input information 158(0)-158(R) in the matching execution refill entry 146(0)-146(R) in the pipeline execution refill circuit 144, the instruction reuse circuit 142 knows that execution of the next instruction 108D will generate the same output information 154 when executed as was generated when the next instruction 108D was previously executed. As discussed above, the previous output information 154 of the next instruction 108D when previously executed in the execution circuit 116 was captured as output information 160(0)-160(R) in the matching execution refill entry 146(0)-146(R) associated with the next instruction 108D based on its source identification 148. Thus, the instruction reuse circuit 142 can reuse the same output information 160(0)-160(R) that was previously captured in the matching execution refill entry 146(0)-146(R) associated with the next instruction 108D based on its source identification 148 in the instruction pipeline $I_0$-$I_N$ for the next instruction 108D to be processed without having to be re-executed. For example, as discussed above, the instruction reuse circuit 142 can cause the output information 160(0)-160(R) previously captured in the pipeline execution refill circuit 144 for the next instruction 108D to be committed by the commit circuit 136 without re-executing in the execution circuit 116. The corresponding output information 160(0)-160(R) in the pipeline execution refill circuit 144 for a re-fetched PDI 108D and/or its successor, younger fetched instructions 108D can also be written back to a physical register $P_0$-$P_X$ that is mapped to an output register operand of the PDI 108D and/or its successor, younger fetched instructions 108D.

Thus, by re-using execution information to process the PDI 108D and/or its successor instructions 108D in the instruction pipeline $I_0$-$I_N$ based on previously captured execution information of such instructions 108D, latency associated with re-execution of such instructions 108D would not be incurred in the instruction throughput of the instruction processing circuit 104. As discussed above, the PDI detection circuit 140 is configured to capture execution information about a PDI 108D and/or its successor instructions 108D in the instruction pipeline $I_0$-$I_N$ based on detecting a PDI 108, because a PDI 108 is an instruction that is more likely to cause a hazard when executed that causes a flush event 138 to occur. The instruction processing circuit 104 re-fetches instructions 108 in the instruction pipeline $I_0$-$I_N$ for execution that were flushed. The instruction reuse circuit 142 can be configured to monitor all instructions 108D being processed to determine if execution information exists in the pipeline execution refill circuit 144 for re-use.

Alternatively, the instruction reuse circuit 142 can start to monitor instructions 108D in response to a flush event 138 to determine if execution information exists in the pipeline execution refill circuit 144 for re-use. Configuring the instruction reuse circuit 142 to only start monitoring instructions 108D for re-use of execution information in response to a flush event 138 may be desired if it is more desired to avoid re-execution of re-fetched instructions in response to a flush event 138. This is because if all instructions 108D are monitored in the instruction pipeline $I_0$-$I_N$, more power consumption and/or resources may be incurred by the instruction reuse circuit 142 and/or in the instruction processing circuit 104 to monitor all instructions 108D.

FIG. 2A is a flowchart illustrating an exemplary process 200 of the instruction processing circuit 104 in FIG. 1 detecting a PDI 108D in the instruction pipeline $I_0$-$I_N$ into the pipeline execution refill circuit 144 in FIG. 1. As discussed above, the is so that one or more execution refill entries 146(0)-146(R) can be allocated in the pipeline execution refill circuit 144 to capture execution information about PDI 108D and/or its successor, younger instructions 108D for later reuse. This allows PDI 108D and/or its successor, younger instructions 108D that are re-fetched and re-processed into the instruction pipeline $I_0$-$I_N$ to be processed without execution if the same input information 152 for the re-fetched PDI 108D and/or its successor, younger instructions 108D was previously captured in the pipeline execution refill circuit 144. As discussed above, PDIs 108D that are not flushed and re-fetched for re-execution (e.g., a conditional branch instruction) in response to the flush event 138 need not be captured in the pipeline execution refill circuit 144 in response to being detected. The process 200 in FIG. 2A is discussed below in conjunction with the processor 102 in FIG. 1.

In this regard, the process 200 includes fetching a plurality of instructions 108 as a plurality of fetched instructions 108F from a program code into an instruction pipeline $I_0$-$I_N$ to be executed (block 202 in FIG. 2A). The process 200 also includes the PDI detection circuit 140 detecting if a fetched instruction 108D in the instruction pipeline $I_0$-$I_N$ is a PDI 108D (block 204 in FIG. 2A). There are a number of ways that the PDI detection circuit 140 can detect if the fetched instruction 108D in the instruction pipeline $I_0$-$I_N$ is a PDI 108D, examples of which are discussed in more detail below. The PDI detection circuit 140 then optionally determines if execution information for the detected instruction 108D was previously captured in the pipeline execution refill circuit 144 so that it can be determined whether the PDI 108D and its younger, successor fetched instructions 108D have already been captured previously. In this regard, in this example, in response to the PDI detection circuit 140 detecting the fetched instruction 108D as a detected instruction, which can be a PDI 108D and/or a younger, successor instruction 108D of the PDI (block 204 in FIG. 2A), the PDI detection circuit 140 determines if a source identification 148 (e.g., a source address, a program counter (PC)) of the detected instruction 108D matches a source identification 156(0)-156(R) (e.g., a source address, PC) in a refill tag 150(0)-150(R) in an execution refill entry 146(0)-146(R) in the pipeline execution refill circuit 144 (block 206 in FIG. 2A). This is to determine if execution information for the detected fetched instruction 108D has already been previously captured in the pipeline execution refill circuit 144 by the PDI detection circuit 140. If so, execution information for the detected fetched instruction 108D does not have to be re-captured in the pipeline execution refill circuit 144.

In one example, the instruction processing circuit 104 is configured to capture execution information for the fetched PDI 108D itself in the pipeline execution refill circuit 144 in response to the detected PDI 108D, if the PDI 108D is a type of instruction that would also be flushed in response to a flush event 138 and thus would need to be re-fetched. This is so that this captured execution information for the fetched PDI 108 can also be later reused by the instruction reuse circuit 142 as a re-fetched PDI 108, such as in response to a flush event 138, without the need for re-fetching the PDI 108. An example of a PDI 108 that is flushed and thus re-fetched for re-execution in response to a flush event 138 is a memory load instruction that encountered a deadlock. In another example, the instruction processing circuit 104 is not configured to capture the execution information for the fetched PDI 108D in the pipeline execution refill circuit 144 in response to the detected PDI 108D if the PDI 108D, is a type of instruction that would not be flushed in response to a flush event 138 and thus would need to be re-fetched. This is because the captured fetched PDI 108D does not need to be re-executed if of a type of PDI that is not flushed if its execution causes a hazard that generates the flush event 138. An example of a PDI 108 that is not flushed and thus not re-fetched for re-execution in response to a flush event 138 is a conditional branch instruction that was mispredicted.

With continuing reference to FIG. 2A, in response to the source identification 148 of the detected instruction 108D not matching a source identification 156(0)-156(R) in a refill tag 150(0)-150(R) in an execution refill entry 146(0)-146(R) (block 208 in FIG. 2A), the PDI detection circuit 140 stores the source identification 148 of the detected instruction 108D, which is the detected PDI 108D and/or one or more younger, successor instruction 108D following the detected PDI 108D, in one or more refill tags 150(0)-150(R) of one or more respective execution refill entries 146(0)-146(R) in the pipeline execution refill circuit 144 (block 210 in FIG. 2A). The PDI detection circuit 140 is then configured to store one or more input information 152 for execution of the one or more detected instructions 108D as respective one or more input information 158(0)-158(R) in the one or more execution refill entries 146(0)-146(R) (block 212 in FIG. 2A). The instruction processing circuit 104 is then configured to store one or more output information 154 generated by the execution circuit 116 in execution of the one or more detected instructions 108D as respective one or more output information 160(0)-160(R) in the one or more execution refill entries 146(0)-146(R) (block 214 in FIG. 2A). The detected instruction 108D and/or its one or more successor, younger fetched instructions 108D are then processed and executed in the execution circuit 116 (block 216 in FIG. 2A).

FIG. 2B is a flowchart illustrating an exemplary process 220 of the instruction reuse circuit 142 in FIG. 1 reusing execution information, and more specifically output information 160(0)-160(R) previously captured in the pipeline execution refill circuit 144 from a previously execution of a fetched instruction 108D to avoid having to re-execute such fetched instruction 108D. The output information 160(0)-160(R) was previously captured by the PDI detection circuit 140 and/or the instruction processing circuit 104 for the fetched instruction 108D (i.e., a detected PDI 108D and/or fetched, successor, younger instructions 108D following the PDI 108D). As an example, the instruction reuse circuit 142 can reuse execution information previously captured for the fetched instruction 108D in response to the flush event 138. The process 220 in FIG. 2B is discussed below in conjunction with the processor 102 in FIG. 1.

In this regard, the process 220 includes the processor 102 generating a pipeline flush event 138 to flush the instruction pipeline $I_0$-$I_N$ in response to the executing of an instruction 108D among the plurality of instructions 108D generating a hazard as a PDI 108D (block 222 in FIG. 2B). In response to the pipeline flush event 138 (block 224 in FIG. 2B), the instruction reuse circuit 142 determines if a source identification 148 of the fetched instruction 108D matches a source identification 156(0)-156(R) in a refill tag 150(0)-150(R) in an execution refill entry 146(0)-146(R) as a matching execution refill entry 146(0)-146(R) of the pipeline execution refill circuit 144 (block 226 in FIG. 2B). In response to the source identification 148 of the fetched instruction 108D matching the source identification 156(0)-156(R) in the refill tag 150(0)-150(R) of the matching execution refill entry 146(0)-146(R), the instruction reuse circuit 142 is configured to determine if input information 152 of the fetched instruction 108D matches input information 158(0)-158(R) in the matching execution refill entry 146(0)-146(R) (block 228 in FIG. 2B). In response to the input information 152 of the fetched instruction 108D matching the input information 158(0)-158(R) in the matching execution refill entry 146(0)-146(R), the instruction reuse circuit 142 is configured to cause output information 160(0)-160(R) for the fetched instruction 108D in the matching execution refill entry 146(0)-146(R) for the fetched instruction 108D to be committed (block 230 in FIG. 2B). In this manner, the previously captured output information 160(0)-160(R) for the fetched instruction 108D is reused without having to re-execute the fetched instruction 108D.

There are different options and features that can be provided in the instruction processing circuit 104 to support reuse of execution information for detected instructions 108D (i.e., a detected PDI 108D and/or its successor, younger instructions 108D) in an instruction pipeline in response to a pipeline flush caused by execution of the PDI, to avoid the need to re-execute the detected instructions. In this regard, FIG. 3 is diagram of another exemplary processor-based system 300 that includes a processor 302 with an instruction processing circuit 304 that is similar to the instruction processing circuit 104 in FIG. 1. Common circuits and components between the instruction processing circuit 104 in FIG. 1 and the instruction processing circuit 304 in FIG. 3 are shown with common element numbers and are not re-described.

As shown in FIG. 3, the instruction processing circuit 304 includes a PDI detection circuit 340 that is similar to the PDI detection circuit 140 in FIG. 1. The instruction processing circuit 304 in FIG. 3 also includes an instruction reuse circuit 342 that is similar to the instruction reuse circuit 142 in FIG. 1. The PDI detection circuit 340 is configured to detect PDIs 108D among the fetched instructions 108D that have been fetched into an instruction pipeline $I_0$-$I_N$ to be processed and executed. For example, the PDI detection circuit 340 may be configured to detect PDIs 108D after being decoded in the instruction decode circuit 120. The PDI detection circuit 340 in the example in FIG. 3 is coupled to the instruction pipelines $I_0$-$I_N$ between the instruction decode circuit 120 and the rename circuit 122 in an in-order stage of the instruction pipelines $I_0$-$I_N$ so that the PDI detection circuit 340 can receive decoded information about decoded instructions 108D to detect a decoded PDI 108D. The PDI detection circuit 340 in this example is configured to receive decoded instructions 108D in an in-order stage of the instruction pipelines $I_0$-$I_N$, so that if the decoded instruction 108D is detected as a PDI 108D, the PDI detection circuit 340 can be configured to capture execution information for subsequent decoded instructions 108D in the instruction pipelines $I_0$-$I_N$ that are known to follow the detected PDI 108D in the program code from which the instruction stream 114 was fetched from.

There are different ways that the PDI detection circuit 340 can detect if a fetched instruction 108F or a decoded instruction 108D is a PDI. In one example, if the decoded instruction 108D is a branch instruction that has a branch behavior that is resolved at execution, such as a conditional branch instruction, indirect branch instruction, or conditional, indirect branch instruction, the PDI detection circuit 340 can be configured to use a branch predictor confidence 362 updated by the control flow prediction circuit 118. The branch predictor confidence 362 is a measure of the confidence that a branch behavior of the branch instruction 108D can be correctly predicted. The control flow prediction circuit 118 may be configured to predict a branch behavior of the branch instruction 108D, and update the branch predictor confidence 362 based on whether the predicted branch behavior matches a resolution of the branch behavior determined by the execution circuit 116 when the branch instruction 108D was previously executed in the past. Thus, the PDI detection circuit 340 can use the branch predictor confidence 362 to predict or determine if a branch instruction 108D is a PDI. Branch instructions 108D that have a low branch predictor confidence 362 are more likely to be mispredicted and thus more likely to cause a hazard when executed in the execution circuit 116 that causes a flush event 138 to be generated.

The PDI detection circuit 340 can also be configured to determine if a memory operation instruction 108D, such as a load instruction, is a PDI. The memory operation instruction 108D involves performing a memory operation at a specified memory address, which may be a direct memory address or an indirect memory address. The execution circuit 116 can be configured to store a PDI indicator corresponding to a memory operation instruction 108D when a hazard occurs when the memory operation instruction 108D is executed and a flush event 138 occurs. The execution circuit 116 may be configured to store the PDI indicator in a PDI indicator circuit 364 that contains a plurality of PDI indicator entries 366(0)-366(I) in which a PDI indicator can be stored corresponding to a memory operation instruction. When the PDI detection circuit 340 receives a memory operation instruction 108D to determine if it is a PDI, the PDI detection circuit 340 can consult the PDI indicator circuit 364 to determine if a PDI indicator is present in a PDI indicator entry 366(0)-366(I) for the memory operation instruction 108D. The PDI detection circuit 340 can use the PDI indicator to determine if the corresponding memory operation instruction 108D should be considered a PDI for PDI detection purposes.

With continuing reference to FIG. 3, in response to the PDI detection circuit 340 detecting a received instruction 108D in an instruction pipeline $I_0$-$I_N$ as a PDI, the PDI detection circuit 340 is configured to capture execution information, such as source identification 348 and input information 352 of detected instructions 108D. The source identification 348 can be a PC of a detected instruction 108D. The input information 352 can be an input operand value(s) used by the execution circuit 116 to execute the detected instruction 108D, or input operands named in the detected instruction 108D. The instruction processing circuit 304, such as the PDI detection circuit 340, is also configured to capture output information 354 from execution of detected instructions 108D by the execution circuit 116. The detected instructions 108D can be the detected PDI 108D and/or its successor, younger fetched instructions 108D that follow the fetched PDI 108D in the instruction pipeline $I_0$-$I_N$ in a pipeline execution refill circuit 344. As previously discussed, if the detected PDI 108D is a type of PDI that is not flushed and re-fetched for re-execution, the PDI detection circuit 340 does not need to capture execution information for the detected PDI 108D. The PDI detection circuit 340 may just capture execution information for successor, younger fetched instructions 108D that follow the fetched PDI 108D in the pipeline execution refill circuit 344. As discussed below, this allows the instruction reuse circuit 342 to obtain execution information about these fetched instructions 108D when re-fetched, such in response to a flush event 138, to be reused and injected into the instruction pipeline $I_0$-$I_N$ for processing to avoid the need to re-execute the detected instructions 108D. The pipeline execution refill circuit 344 can be a memory table circuit that includes a plurality of execution refill entries 346(0)-346(R) each configured to store information about detected instructions 108D, including a detected PDI 108D and/or its successor, younger fetched instructions 108D. A more detailed example of the pipeline execution refill circuit 344 in FIG. 3 is illustrated in FIG. 4 and discussed below.

FIG. 4 is a diagram of the exemplary pipeline execution refill circuit 344 in FIG. 3 configured to store captured execution information for fetched, detected instructions 108D (i.e., a detected PDI 108D and/or its fetched, successor, younger instructions 108D) present in the instruction pipeline $I_0$-$I_N$ in the processor 302 in FIG. 3. The pipeline execution refill circuit 344 includes a plurality of execution refill entries 346(0)-346(R) that are each configured to be allocated to store a source identification 348 (e.g., a PC) of a detected instruction 108D (i.e., the detected PDI 108D and/or its successor, younger instruction 108D) in response to detection of a PDI 108D by the PDI detection circuit 340. The execution refill entries 346(0)-346(R) are configured to store a source identification 356 of a detected instruction 108D that is later used to identify the detected instruction 108D by the instruction reuse circuit 342 when the detected instruction 108D is re-fetched for execution in the instruction pipeline $I_0$-$I_N$. The execution refill entries 346(0)-346(R) are also configured to store input information 358 used to execute the detected instructions 108D processed in the instruction pipeline $I_0$-$I_N$ as part of the execution information. The execution refill entries 346(0)-346(R) are also configured to store output information 360 generated by execution of such detected instructions 108D in the instruction pipeline $I_0$-$I_N$, for later reuse by the instruction reuse circuit 342 when the detected instruction 108D is re-fetched for execution. The pipeline execution refill circuit 344 will be discussed in conjunction with discussing exemplary operation of the PDI detection circuit 340 in FIG. 3.

In this regard, when the PDI detection circuit 340 detects a received decoded instruction 108D being processed in the instruction pipeline $I_0$-$I_N$ as a PDI as discussed above, the PDI detection circuit 340 can first determine if an execution refill entry 346(0)-346(R) in the pipeline execution refill circuit 344 has already been allocated for the PDI 108D and/or its successor, younger instructions 108D. If so, there is no need to reallocate another execution refill entry 346 (0)-346(R) for such detected instruction 108D. In this example, to determine if an execution refill entry 346(0)-346(R) in the pipeline execution refill circuit 344 has already been allocated and is storing a detected instruction 108D, the PDI detection circuit 340 is configured to determine if a source identification 348 of the detected instruction 108D (i.e., the PDI 108D and/or its younger, successor instruction 108D) in FIG. 3 matches a source identification 356(0)-356 (R) in a respective refill tag 350(0)-350(R) in an execution refill entry 346(0)-346(R) in the pipeline execution refill circuit 344. The source identification 348 of the detected instruction 108D can be the program counter (PC) of the detected instruction 108D, which uniquely identifies its presence in a program code from which it was fetched into the instruction stream 114 of the instruction processing circuit 304. If the source identification 348 of the detected instruction 108D is contained in a source identification 356(0)-356(R) in a respective refill tag 350(0)-350(R) in an execution refill entry 346(0)-346(R) in the pipeline execution refill circuit 344, this means that the detected instruction 108D (i.e., a PDI 108D and/or its successor, younger instruction 108D) is already stored in the execution refill entry 346(0)-346(R) which included the respective refill tag 350 (0)-350(R) having the matching source identification 356 (0)-356(R). In this case, the PDI detection circuit 340 does not need to further process storing information about the detected instruction 108D in the pipeline execution refill circuit 344.

However, if the source identification 348 of the detected instruction 108D is not contained in a source identification 356(0)-356(R) in a respective refill tag 350(0)-350(R) in an execution refill entry 346(0)-346(R) in the pipeline execution refill circuit 344, the PDI detection circuit 340 is configured to process the detected instruction 108D. The PDI detection circuit 340 is configured to allocate an available execution refill entry 346(0)-346(R) in the pipeline execution refill circuit 344 to store the source identification 348 of the detected instruction 108D in a respective source identification 356(0)-356(R) for the allocated execution refill entry 346(0)-346(R) for later identification by the instruction reuse circuit 342 discussed in more detail below. If the detected instruction 108D is a PDI 108 that is not flushed and re-executed in response to a flush event 138, an execution refill entry 346(0)-346(R) is not allocated for the PDI 108D. An execution refill entry 346(0)-346(R) is allocated for the successor, younger instructions 108D following the PDI 108D as detected instructions 108D. The PDI detection circuit 340 is also configured to store the source identification 348 of the detected instruction 108D in the source identification 356(0)-356(R) in the allocated execution refill entry 346(0)-346(R) in the pipeline execution refill circuit 344.

The PDI detection circuit 340 in FIG. 3 is then configured to set a valid indicator 368(0)-368(R) for the corresponding allocated execution refill entry 346(0)-346(R) in the pipeline execution refill circuit 344 in FIG. 4 to a valid state. This is so that the instruction reuse circuit 342 will know it is valid to consult a matching execution refill entry 346(0)-346(R) to reuse previously captured execution information for instructions 108D in the execution refill entry 346(0)-346(R) corresponding to a PDI 108E that caused a flush event 138.

The PDI detection circuit 340 is then configured to capture input information 352 used to execute a detected instruction 108D and output information 354 generated by the execution circuit 116 when executing the detected instruction 108D. The PDI detection circuit 340 is configured to store input information 352 used to executed a detected instruction 108D from the instruction pipeline $I_0$-$I_N$ in a respective input information 358(0)-358(R) in the execution refill entry 346(0)-346(R) in the pipeline execution refill circuit 344 allocated to the detected instruction 108D. Then, after the detected instruction 108D is executed, the PDI detection circuit 340 or other circuit in the instruction processing circuit 104 is configured to store the generated output information 354 produced by the execution circuit 116 from execution of the detected instruction 108D in a respective output information 360(0)-360(R) in the execution refill entry 346(0)-346(R) in the pipeline execution refill circuit 344 allocated for the detected instruction 108D. In this manner, as discussed above and below, when the instruction reuse circuit 342 determines that the source identification 348 of a newly fetched instruction 108D matches the source identification 356(0)-356(R) of an execution refill entry 346(0)-346(R) in the pipeline execution refill circuit 344, and the valid indicator 368(0)-368(R) of the execution refill entry 346(0)-346(R) indicates a valid state in this example, the instruction reuse circuit 342 can consult the input information 358(0)-358(R) for such execution refill entry 346(0)-346(R). If the valid indicator 368(0)-368(R) of the matching execution refill entry 346(0)-346(R) indicates an invalid state, the detected instruction 108D is allowed to be re-executed.

The PDI detection circuit 340 is then configured to capture the input information 352 for the detected instruction 108D as respective input information 358(0)-358(R) in the allocated execution refill entry 346(0)-346(R) for the detected instruction 108D. The PDI detection circuit 340 or other circuit in the instruction processing circuit 304 is also configured to capture the output information 354 generated by execution of the detected instruction 108D in the execution circuit 116 as output information 360(0)-360(R) in the execution refill entry 346(0)-346(R) for the fetched instruction 108D. If the detected PDI 108D does not cause a hazard when later executed in the execution circuit 116 to cause flush event 138 to be generated, the instruction processing circuit 104 can optionally de-allocate the execution refill entry 346(0)-346(R) for the fetched instructions 108D allocated in response to the detected PDI 108 since a re-fetch and re-execution of the PDI 108 and its younger, successor instructions 108D may not occur.

The PDI detection circuit 340 can be configured to stop capturing execution information for subsequent, successor, younger instructions 108D after a detected PDI 108D in the pipeline execution refill circuit 344 in response to the detected PDI 108D when a next PDI 108D is encountered by the PDI detection circuit 340 in the instruction stream 114 as an example. As another example, the PDI detection circuit 340 can be configured to stop capturing execution information for subsequent, successor, younger instructions 108D after a detected PDI 108D in the pipeline execution refill circuit 344 in response to the detected PDI 108D once the pipeline execution refill circuit 344 is full. Or, the PDI detection circuit 340 can be configured to stop capturing execution information for subsequent, successor, younger instructions 108D when a next PDI 108D is encountered or the pipeline execution refill circuit 344 is full, whichever occurs first as another example.

Each execution refill entry 346(0)-346(R) in pipeline execution refill circuit 344 in FIG. 4 can also be configured to store a respective useful indicator 370(0)-370(R). As will be discussed in more detail below, the useful indicator 370(0)-370(R) is configured to store a usefulness indicating how useful the execution refill entry 346(0)-346(R) is. Usefulness stored in the useful indicator 370(0)-370(R) is a measure of how likely the PDI 108D associated with a respective execution refill entry 346(0)-346(R) will be used by the instruction reuse circuit 342 to reuse the fetched instructions 108D in the execution refill entry 346(0)-346(R). The usefulness may be a count value, and the useful indicator 370(0)-370(R) may be a counter, as examples. The useful indicator 370(0)-370(R) can allow a separate process to update and monitor the usefulness stored in the useful indicator 370(0)-370(R) as a way to control deallocation of execution refill entries 346(0)-346(R) to make room for execution information for future detected PDIs 108D and their associated successor instructions 108D to be captured for later reuse.

With reference back to FIG. 3, as discussed above, the instruction reuse circuit 342 is configured to reuse previously executed information for previously executed instructions 108D in an execution refill entry 346(0)-346(R) in the pipeline execution refill circuit 344 corresponding to the executed PDI 108E. In an example, in response to the flush event 138, the instruction reuse circuit 342 is configured to determine a source identification 348 of a detected instruction 108D (i.e., the PDI 108D and/or its younger, successor instructions 108D). For example, the source identification 348 of the detected instruction 108D may be a PC. The instruction reuse circuit 342 can be configured to determine if the source identification 348 of the detected instruction 108D matches (i.e., a hit) a source identification 356(0)-356(R) in a corresponding refill tag 350(0)-350(R) in a corresponding execution refill entry 346(0)-346(R) in the pipeline execution refill circuit 344. If so, the instruction reuse circuit 342 is configured to determine if the input information 352 for the detected instruction 108D matches the input information 358(0)-358(R) in its matching execution refill entry 346(0)-346(R). If so, this means that the previously captured output information 360(0)-360(R) for its execution refill entry 346(0)-346(R) will be generated the same again by the execution circuit 116 if the newly fetched instruction 108D is executed. Thus, the instruction reuse circuit 342 can commit the captured output information 360(0)-360(R) in the matching execution refill entry 346(0)-346(R) for the newly fetched instruction 108D rather than having to re-execute the newly fetched instruction 108D. This avoids the need to re-execute the newly fetched instruction 108D. The instruction reuse circuit 342 can also be configured to provide the output information 360(0)-360(R) for the fetched instruction 108D in the matching execution refill entry 346(0)-346(R) for the fetched instruction 108D, to a logical register named by an output operand of the fetched instruction 108D to the register access circuit 132 to be stored in a register. If the instruction reuse circuit 342 determines the source identification 348 of the detected instruction 108D does match (i.e., a hit) a source identification 356(0)-356(R) in a refill tag 350(0)-350(R) of an execution refill entry 346(0)-346(R), but the input information 352 of the detected instruction 108D does not match the input information 358(0)-358(R) of the matching execution refill entry 3460)-346(R), the instruction reuse circuit 342 can ignore the detected instruction 108D and it will be re-executed.

If the instruction reuse circuit 342 determines the source identification 348 of the detected instruction 108D does not match (i.e., a miss) a source identification 356(0)-356(R) in a refill tag 350(0)-350(R) of an execution refill entry 346(0)-346(R) in the pipeline execution refill circuit 344, the instruction reuse circuit 342 can ignore the detected instruction 108D. The instruction fetch circuit 106 will re-execute such detected instruction 108D. As an option, if the instruction reuse circuit 342 determines the source identification 348 of the detected instruction 108D does not match (i.e., a miss) a source identification 356(0)-356(R) in a refill tag 350(0)-350(R), the instruction reuse circuit 342 can also then determine if the detected instruction 108D names an output logical register as an output operand. If so, the instruction reuse circuit 342 can be configured to set the valid indicator 368(0)-368(R) in any execution refill entry 346(0)-346(R) in the pipeline execution refill circuit 344 that contains the same output logical register as input information 358(0)-358(R). This is to prevent another read-after-write (RAW) hazard if execution information for another detected instruction 108D captured in the pipeline execution refill circuit 344 is re-fetched for re-execution, because its input information 358(0)-358(R) may be invalid due to the current detected instruction 108D being re-executed and producing new output information 354 that is not the same output information 360(0)-360(R) in the detected instruction 108D in the pipeline execution refill circuit 344.

As discussed above, it may be desirable to provide a mechanism to de-allocate execution refill entries 346(0)-346(R) in the pipeline execution refill circuit 344 to make room for capturing newer detected instructions (i.e., PDIs 108D that caused a flush event 138 and/or their successor, younger instructions 108D) for potential re-use. Some execution refill entries 346(0)-346(R) in the pipeline execution refill circuit 344 may be allocated to detected instructions 108D that are not as useful (i.e., not as likely to occur in the future) as newer executed PDIs 108E that caused a flush event 138.

As discussed above, the instruction reuse circuit 342 determines that the source identification 348 of the detected instruction 108D (i.e., a detected PDI 108D and/or its younger, successor instructions 108D) is already contained in a valid execution refill entry 346(0)-346(R) in the pipeline execution refill circuit 344 (i.e., the source identification 348 matches a source identification 356(0)-356(R)). If the source identification 348 of the PDI 108D and/or its younger, successor instructions 108D is already contained in a valid execution refill entry 346(0)-346(R), the instruction reuse circuit 342 can be configured to increase the usefulness in the corresponding useful indicator 370(0)-370(R) in the corresponding execution refill entry 346(0)-346(R). For example, if the useful indicator 370(0)-370(R) is a counter, the instruction reuse circuit 342 can be configured to increment the useful indicator 370(0)-370(R) to signify an increased usefulness as an example. However, if the source identification 348 of the executed PDI 108E is not already contained in a valid execution refill entry 346(0)-346(R), such that a new valid execution refill entry 346(0)-346(R) needs to be allocated, the instruction reuse circuit 342 could decrease the usefulness of all useful indicators 370(0)-370(R) equally in the corresponding execution refill entry 346(0)-346(R) as one example. If the usefulness in a useful indicator 370(0)-370(R) of an execution refill entry 346(0)-346(R) in the pipeline execution refill circuit 344 falls below a set threshold usefulness, the instruction reuse circuit 342 or other circuit could be configured to de-allocate such execution refill entry 346(0)-346(R) to free such execution refill entry 346(0)-346(R) to be re-allocated for a new detected instruction 108D.

Alternatively, instead of decreasing the usefulness of all useful indicators 370(0)-370(R) equally in the corresponding execution refill entry 346(0)-346(R) right away in response to a miss to the pipeline execution refill circuit 344, if a source identification 348 of the detected instruction 108D (i.e., PDI 108D and/or its younger, successor instructions 108D) is not already contained in a valid execution refill entry 346(0)-346(R), a global allocation fail indicator 374 in FIG. 3 could be incremented or increased. Then, once the global allocation fail indicator 374 exceeds a threshold global allocation, the usefulness of the useful indicators 370(0)-370(R) in each execution refill entry 346(0)-346(R) can be decreased. This mechanism controls the rate of decrease in usefulness of the useful indicators 370(0)-370(R) in each execution refill entry 346(0)-346(R) to not correspond on a per miss event basis to the pipeline execution refill circuit 344. Again, if the usefulness in a useful indicator 370(0)-370(R) of an execution refill entry 346(0)-346(R) in the pipeline execution refill circuit 344 falls below a set threshold usefulness, the instruction reuse circuit 342 or other circuit could be configured to de-allocate such execution refill entry 346(0)-346(R) to free such execution refill entry 346(0)-346(R) to be re-allocated for a new detected instruction 108D.

As another alternative, the usefulness in the useful indicators 370(0)-370(R) of an execution refill entry 346(0)-346(R) in the pipeline execution refill circuit 344 could be decreased every so many instructions 108D processed in the instruction pipeline $I_0$-$I_N$. As another alternative, the usefulness in the useful indicators 370(0)-370(R) of an execution refill entry 346(0)-346(R) in the pipeline execution refill circuit 344 could be decreased every so many detected instructions 108D by the PDI detection circuit 340. As another alternative, the usefulness in the useful indicators 370(0)-370(R) of an execution refill entry 346(0)-346(R) in the pipeline execution refill circuit 344 could be decreased every so many flush events 138.

FIG. 5 is a block diagram of an exemplary processor-based system 500 that includes a processor 502 (e.g., a microprocessor) that includes an instruction processing circuit 504 that includes a PDI detection circuit 505 for detecting PDIs, and capturing execution information for detected instructions that are the PDI and/or its successor, younger instructions that follow the PDI. The instruction processing circuit 504 includes an instruction reuse circuit 506 for reusing execution information previously captured for such fetched instructions when re-fetched for re-execution, such as in response to a flush event caused by execution of a corresponding PDI. For example, the processor 502 in FIG. 5 could be the processor 102 in FIG. 1 or processor 302 in FIG. 3. As another example, the instruction processing circuit 504 could be the instruction processing circuit 104 in FIG. 1 or the instruction processing circuit 304 in FIG. 3. As another example, the PDI detection circuit 505 could be the PDI detection circuit 140 in FIG. 1 or the PDI detection circuit 340 in FIG. 3. The PDI detection circuit 505 can include components contained in and functions performed by the PDI detection circuit 140 and/or the PDI detection circuit 340 previously described. As another example, the instruction reuse circuit 506 could be the instruction reuse circuit 142 in FIG. 1 or the instruction reuse circuit 342 in FIG. 3. The instruction reuse circuit 506 can include components contained in and functions performed by the instruction reuse circuit 142 and/or the instruction reuse circuit 342 previously described.

The processor-based system 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 500 includes the processor 502. The processor 502 represents one or more general-purpose processing circuits, such as a microprocessor, central processing unit, or the like. More particularly, the processor 502 may be an EDGE instruction set microprocessor, or other processor implementing an instruction set that supports explicit consumer naming for communicating produced values resulting from execution of producer instructions. The processor 502 is configured to execute processing logic in instructions for performing the operations and steps discussed herein. In this example, the processor 502 includes an instruction cache 508 for temporary, fast access memory storage of instructions accessible by the instruction processing circuit 504. Fetched or pre-fetched instructions from a memory, such as from a system memory 510 over a system bus 512, are stored in the instruction cache 508. The instruction processing circuit 504 is configured to process instructions fetched into the instruction cache 508 and process the instructions for execution.

The processor 502 and the system memory 510 are coupled to the system bus 512 and can intercouple peripheral devices included in the processor-based system 500. As is well known, the processor 502 communicates with these other devices by exchanging address, control, and data information over the system bus 512. For example, the processor 502 can communicate bus transaction requests to a memory controller 514 in the system memory 510 as an example of a slave device. Although not illustrated in FIG. 5, multiple system buses 512 could be provided, wherein each system bus constitutes a different fabric. In this example, the memory controller 514 is configured to provide memory access requests to a memory array 516 in the system memory 510. The memory array 516 is comprised of an array of storage bit cells for storing data. The system memory 510 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 512. As illustrated in FIG. 5, these devices can include the system memory 510, one or more input device(s) 518, one or more output device(s) 520, a modem 522, and one or more display controllers 524, as examples. The input device(s) 518 can include any type of input device, including but not limited to input keys, switches, voice processors, etc. The output device(s) 520 can include any type of output device, including but not limited to audio, video, other visual indicators, etc. The modem 522 can be any device configured to allow exchange of data to and from a network 526. The network 526 can be any type of network, including but not limited to a wired or wireless network, a private or public network, a local area network (LAN), a wireless local area network (WLAN), a wide area network (WAN), a BLUETOOTH™ network, and the Internet. The modem 522 can be configured to support any type of communications protocol desired. The processor 502 may also be configured to access the display controller(s) 524 over the system bus 512 to control information sent to one or more displays 528. The display(s) 528 can include any type of display, including but not limited to a cathode ray tube (CRT), a liquid crystal display (LCD), a plasma display, etc.

The processor-based system 500 in FIG. 5 may include a set of instructions 530 to be executed by the processor 502 for any application desired according to the instructions. The instructions 530 may be stored in the system memory 510, processor 502, and/or instruction cache 508 as examples of a non-transitory computer-readable medium 532. The instructions 530 may also reside, completely or at least partially, within the system memory 510 and/or within the processor 502 during their execution. The instructions 530 may further be transmitted or received over the network 526 via the modem 522, such that the network 526 includes the computer-readable medium 532.

While the computer-readable medium 532 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor, comprising:
   an instruction processing circuit, comprising:
   an instruction fetch circuit configured to fetch a plurality of instructions as a plurality of fetched instructions from a program code into an instruction pipeline to be executed; and
   an execution circuit coupled to the instruction fetch circuit, the execution circuit configured to:
   execute a fetched instruction among the plurality of fetched instructions in the instruction pipeline; and
   generate a pipeline flush event to flush the instruction pipeline in response to the execution of a fetched instruction among the plurality of fetched instructions comprising a performance degrading instruction (PDI) generating a hazard; and
   an instruction reuse circuit coupled to the instruction pipeline between the instruction fetch circuit and the execution circuit, the instruction reuse circuit configured to:
   determine if a source identification of the fetched instruction matches a source identification in a refill tag in an execution refill entry as a matching execution refill entry among a plurality of execution refill entries of a pipeline execution refill circuit; and
   in response to the source identification of the fetched instruction matching the source identification in the refill tag in the matching execution refill entry:
   determine if input information of the fetched instruction matches input information in the matching execution refill entry; and
   in response to the input information of the fetched instruction matching the input information in the matching execution refill entry:
   cause output information for the fetched instruction in the matching execution refill entry for the fetched instruction to be committed.

2. The processor of claim 1, wherein the instruction reuse circuit is configured to, in response to the pipeline flush event:
   determine if the fetched instruction matches the source identification in the refill tag in the execution refill entry as the matching execution refill entry among the plurality of execution refill entries of the pipeline execution refill circuit; and
   in response to the source identification of the fetched instruction matching the source identification in the refill tag as the matching execution refill entry:
   determine if input information of the fetched instruction matches input information in the matching execution refill entry; and
   in response to the input information of the fetched instruction matching input information in the matching execution refill entry:

cause the output information for the fetched instruction in the matching execution refill entry for the fetched instruction to be committed.

3. The processor of claim 1, wherein the instruction reuse circuit is further configured to, in response to the input information of the fetched instruction matching the input information in the matching execution refill entry, cause the fetched instruction to not be executed in the execution circuit.

4. The processor of claim 1, wherein the instruction processing circuit is further configured to, in response to the input information of the fetched instruction matching the input information in the matching execution refill entry, write the output information for the fetched instruction in the matching execution refill entry for the fetched instruction to a logical register named by an output operand of the fetched instruction in a register file.

5. The processor of claim 1, wherein the instruction reuse circuit is further configured to, in response to the source identification of the fetched instruction not matching the source identification in the refill tag of the matching execution refill entry, cause the fetched instruction to be executed in the execution circuit.

6. The processor of claim 1, wherein the instruction reuse circuit is further configured to, in response to the input information of the fetched instruction not matching the input information in the matching execution refill entry, cause the fetched instruction to be executed in the execution circuit.

7. The processor of claim 1, wherein the instruction reuse circuit is further configured to, in response to the input information of the fetched instruction matching the input information in the matching execution refill entry:
 determine if a valid indicator in the matching execution refill entry indicates an invalid state; and
 in response to the valid indicator in the matching execution refill entry indicating a valid state:
  cause the output information for the fetched instruction in the matching execution refill entry for the fetched instruction to be committed.

8. The processor of claim 7, wherein, the instruction reuse circuit is further configured to, in response to the valid indicator in the matching execution refill entry indicating an invalid state:
 cause the fetched instruction be re-executed in the execution circuit.

9. The processor of claim 1, wherein the instruction reuse circuit is further configured to, in response to the source identification of the fetched instruction not matching the source identification in the refill tag in an execution refill entry among the plurality of execution refill entries of the pipeline execution refill circuit:
 determine if the fetched instruction names an output logical register in an output operand; and
 in response to the fetched instruction naming the output logical register in the output operand:
  set a valid indicator in an execution refill entry among the plurality of execution refill entries of the pipeline execution refill circuit containing the output logical register as input information, to an invalid state.

10. The processor of claim 9, wherein the instruction reuse circuit is further configured to, in response to the input information of the fetched instruction matching the input information in the matching execution refill entry:
 determine if the valid indicator in the matching execution refill entry indicates an invalid state; and
 in response to the valid indicator in the matching execution refill entry indicating a valid state:
  cause the output information for the fetched instruction in the matching execution refill entry for the fetched instruction to be committed.

11. The processor of claim 10, wherein the instruction reuse circuit is further configured to, in response to the valid indicator in the matching execution refill entry indicating an invalid state:
 cause the fetched instruction be re-executed in the execution circuit.

12. The processor of claim 1, wherein the instruction reuse circuit is configured to:
 determine if the input information of the fetched instruction comprising one or more input operand values of the fetched instruction matches the input information comprising one or more input values in the matching execution refill entry; and
 in response to the one or more input operand values of the fetched instruction matching the one or more input values in the matching execution refill entry:
  cause the output information for the fetched instruction in the matching execution refill entry for the fetched instruction to be committed.

13. The processor of claim 1, wherein the instruction reuse circuit is configured to:
 determine if the input information of the fetched instruction comprising one or more input logical registers of the fetched instruction matches the input information comprising one or more input logical registers in the matching execution refill entry; and
 in response to the one or more input logical registers of the fetched instruction matching the one or more input logical registers in the matching execution refill entry:
  cause the output information for the fetched instruction in the matching execution refill entry for the fetched instruction to be committed.

14. The processor of claim 1, wherein the instruction reuse circuit is configured to, in response to the input information of the fetched instruction matching the input information in the matching execution refill entry:
 cause the output information comprising one or more output operand values for the fetched instruction in the matching execution refill entry for the fetched instruction to be committed.

15. The processor of claim 1, wherein:
 the instruction reuse circuit is further configured to, in response to the source identification of the fetched instruction matching the source identification in the refill tag in the matching execution refill entry:
  increase a usefulness in a useful indicator in the matching execution refill entry indicating the usefulness of the matching execution refill entry.

16. The processor of claim 15, wherein:
 the instruction reuse circuit is further configured to, in response to the source identification of the fetched instruction not matching the source identification in the refill tag in the matching execution refill entry:
  decrease the usefulness in the useful indicator in each of the plurality of execution refill entries in the pipeline execution refill circuit.

17. The processor of claim 16, wherein:
 the instruction reuse circuit is further configured to:
  determine if the usefulness in the useful indicator in an execution refill entry among the plurality of execution refill entries in the pipeline execution refill circuit falls below a threshold usefulness; and
  in response to the usefulness in the useful indicator in the execution refill entry falling below the threshold usefulness, deallocate the execution refill entry in the pipeline execution refill circuit.

18. The processor of claim 15, wherein:
the instruction reuse circuit is further configured to, in response to the source identification of the fetched instruction not matching the source identification in the refill tag in the matching execution refill entry, increase a global allocation in a global allocation fail indicator for the pipeline execution refill circuit; and
in response to the global allocation in the global allocation fail indicator exceeding a threshold global allocation, decrease the usefulness of the useful indicator in each execution refill entry among the plurality of execution refill entries in the pipeline execution refill circuit.

19. The processor of claim 18, in response to the usefulness in the useful indicator in an execution refill entry among the plurality of execution refill entries in the pipeline execution refill circuit falling below a threshold usefulness, deallocate the execution refill entry in the pipeline execution refill circuit.

20. The processor of claim 1, further comprising a PDI detection circuit coupled to the instruction pipeline, the PDI detection circuit configured to:
detect if a fetched instruction among the plurality of fetched instructions in the instruction pipeline is a PDI; and
in response to detecting the fetched instruction as a PDI:
store the source identification of one or more fetched instructions comprising at least one of the detected PDI and one or more successor instructions following the detected PDIs one or more detected instructions in the instruction pipeline, in a respective one or more refill tags of one or more execution refill entries among the plurality of execution refill entries in the pipeline execution refill circuit.

21. The processor of claim 20, wherein in response to detecting the fetched instruction as a PDI, the PDI detection circuit is further configured to:
determine if a source identification of the detected instruction matches a source identification in a refill tag in an execution refill entry among the plurality of execution refill entries in the pipeline execution refill circuit; and
in response to the source identification of the detected instruction not matching a source identification in a refill tag in the plurality of execution refill entries in the pipeline execution refill circuit, the PDI detection circuit is configured to:
store the source identification of the one or more detected instructions in the respective one or more refill tags in the pipeline execution refill circuit.

22. The processor of claim 20, wherein the PDI detection circuit is further configured to, in response to the source identification of the detected instruction not matching a source identification in a refill tag in the plurality of execution refill entries in the pipeline execution refill circuit:
determine if a detected instruction among the one or more detected instructions is a PDI; and
in response to determining the detected instruction is a PDI:
not capture the detected instruction determined to be a PDI in the instruction pipeline in an execution refill entry in the pipeline execution refill circuit.

23. The processor of claim 20, wherein the PDI detection circuit is further configured to, in response to detecting the fetched instruction as a PDI:
determine if the pipeline fetch execution circuit is full; and in response to determining the pipeline execution refill circuit is full:
not store the source identification of one or more detected instructions in one or more execution refill entries among the plurality of execution refill entries in the pipeline execution refill circuit.

24. The processor of claim 20, wherein:
the plurality of instructions comprises a branch instruction having a branch behavior;
the instruction fetch circuit is configured to fetch the branch instruction into the instruction pipeline as a fetched branch instruction to be executed;
the instruction processing circuit further comprises a control flow prediction circuit configured to predict the branch behavior of a fetched branch instruction of the branch instruction as fetched branch instruction;
the execution circuit is configured to execute the fetched branch instruction as an executed fetch instruction to generate a resolved branch behavior of the executed branch instruction;
the instruction processing circuit is further configured to:
determine if the resolved branch behavior of the executed branch instruction matches the predicted branch behavior of the fetched branch instruction; and
update a branch predictor confidence corresponding to the branch instruction based on whether the resolved branch behavior matched the predicted branch behavior; and
the PDI detection circuit is configured to detect if the fetched branch instruction in the instruction pipeline is a PDI based on the branch predictor confidence of the branch instruction.

25. The processor of claim 20, wherein:
the plurality of instructions comprises a memory operation instruction;
the instruction fetch circuit is configured to fetch the memory operation instruction into the instruction pipeline as a fetched memory operation instruction to be executed;
the execution circuit is configured to execute the memory operation instruction at a memory address of the memory operation instruction;
the instruction processing circuit is further configured to store a PDI indicator for the memory operation instruction as a PDI in response to the execution circuit generating the pipeline flush event to flush the instruction pipeline in response to the execution of the memory operation instruction; and
the PDI detection circuit is configured to detect if the memory operation instruction in the instruction pipeline is a PDI based on the PDI indicator for the memory operation instruction indicating a PDI.

26. The processor of claim 20, wherein the instruction processing circuit is further configured to, in response to the pipeline flush event generated by execution of the PDI generating the hazard when executed:
de-allocate each execution refill entry among the plurality of execution refill entries in the pipeline execution refill circuit corresponding to the executed PDI.

27. The processor of claim 20, wherein the instruction processing circuit is further configured to, in response to the PDI detection circuit detecting the fetched instruction as a PDI:

store one or more input information for execution of the one or more detected instructions as respective one or more input information in the one or more execution refill entries; and store one or more output information generated by the execution circuit in execution of the one or more detected instructions as respective one or more output information in the one or more execution refill entries.

28. The processor of claim 27, wherein the instruction processing circuit is configured to, in response to the PDI detection circuit detecting the fetched instruction as a PDI:

store one or more input information comprising one or more input operand values of the one or more detected instructions as respective one or more input operand values in the one or more execution refill entries.

29. The processor of claim 27, wherein the instruction processing circuit is configured to, in response to the PDI detection circuit detecting the fetched instruction as a PDI:

store one or more input information comprising one or more input logical registers of the one or more detected instructions as respective one or more input logical registers in the one or more execution refill entries.

30. The processor of claim 27, wherein the instruction processing circuit is configured to, in response to the PDI detection circuit detecting the fetched instruction as a PDI:

store one or more output information comprising one or more output operand values generated by the execution circuit in execution of the one or more detected instructions as respective one or more output operand values in the one or more execution refill entries.

31. A method of reusing executed, flushed instructions in an instruction pipeline in a processor, comprising:

fetching a plurality of instructions as a plurality of fetched instructions from a program code into an instruction pipeline to be executed;

executing a fetched instruction among the plurality of fetched instructions in the instruction pipeline;

generating a pipeline flush event to flush the instruction pipeline in response to the execution of a fetched instruction among the plurality of fetched instructions comprising a performance degrading instruction (PDI) generating a hazard;

determining if a source identification of the fetched instruction before being executed matches a source identification in a refill tag in an execution refill entry as a matching execution refill entry among a plurality of execution refill entries of a pipeline execution refill circuit; and in response to the source identification of the fetched instruction matching the source identification in the refill tag as a matching execution refill entry:

determining if input information of the fetched instruction matches input information in the matching execution refill entry; and in response to the input information of the fetched instruction matching the input information in the matching execution refill entry:

causing output information for the fetched instruction in the matching execution refill entry for the fetched instruction to be committed.

32. The method of claim 31, comprising, in response to the pipeline flush event:

determining if the fetched instruction matches the source identification in the refill tag in the execution refill entry as the matching execution refill entry among the plurality of execution refill entries of the pipeline execution refill circuit; and in response to the source identification of the fetched instruction matching the source identification in the refill tag as the matching execution refill entry:

determining if input information of the fetched instruction matches input information in the matching execution refill entry; and in response to the input information of the fetched instruction matching input information in the matching execution refill entry:

causing the output information for the fetched instruction in the matching execution refill entry for the fetched instruction to be committed.

33. The method of claim 31, further comprising, in response to the input information of the fetched instruction matching the input information in the matching execution refill entry, causing the fetched instruction to not be executed.

34. The method of claim 31, further comprising:

detecting if a fetched instruction among the plurality of fetched instructions in the instruction pipeline is a PDI; and in response to detecting the fetched instruction as a PDI:

storing the source identification of the one or more fetched instructions comprising at least one of the PDI and one or more successor instructions following the detected PDI in the instruction pipeline as one or more detected instructions, in a respective one or more refill tags of one or more execution refill entries among the plurality of execution refill entries in the pipeline execution refill circuit.

35. The method of claim 34, wherein in response to detecting the fetched instruction as a PDI, further comprising:

storing one or more input information for execution of the one or more detected instructions as respective one or more input information in the one or more execution refill entries; and storing one or more output information generated by in execution of the one or more detected instructions as respective one or more output information in the one or more execution refill entries.

\* \* \* \* \*